(12) United States Patent
Lee et al.

(10) Patent No.: US 11,171,509 B2
(45) Date of Patent: Nov. 9, 2021

(54) ADAPTIVE CHARGING NETWORK USING ADAPTIVE CHARGING STATIONS FOR ELECTRIC VEHICLES

(71) Applicant: California Institute of Technology, Pasadena, CA (US)

(72) Inventors: George S. Lee, Pasadena, CA (US); Steven H. Low, La Cañada, CA (US)

(73) Assignee: California Institute of Technology, Pasadena, CA (US)

( * ) Notice: Subject to any disclaimer, the term of this patent is extended or adjusted under 35 U.S.C. 154(b) by 116 days.

(21) Appl. No.: 15/444,311

(22) Filed: Feb. 27, 2017

(65) Prior Publication Data

US 2017/0246961 A1 Aug. 31, 2017

Related U.S. Application Data

(60) Provisional application No. 62/299,957, filed on Feb. 25, 2016.

(51) Int. Cl.
*B60L 53/67* (2019.01)
*H02J 13/00* (2006.01)
(Continued)

(52) U.S. Cl.
CPC ..... *H02J 13/00034* (2020.01); *B60L 11/1824* (2013.01); *B60L 53/305* (2019.02);
(Continued)

(58) Field of Classification Search
CPC .................................................. B60L 11/1824
See application file for complete search history.

(56) References Cited

U.S. PATENT DOCUMENTS

| 5,677,924 A | 10/1997 | Bestwick |
| 6,625,520 B1 | 9/2003 | Chen et al. |

(Continued)

FOREIGN PATENT DOCUMENTS

| CN | 103241130 A | 8/2013 |
| EP | 3179421 A1 | 6/2017 |

(Continued)

OTHER PUBLICATIONS

International Search Report and Written Opinion for International Application No. PCT/US2016/057398, Search completed Jan. 23, 2017, dated Jan. 23, 2017, 8 Pgs.

(Continued)

*Primary Examiner* — Drew A Dunn
*Assistant Examiner* — Tynese V McDaniel
(74) *Attorney, Agent, or Firm* — KPPB LLP

(57) ABSTRACT

Adaptive charging networks in accordance with embodiments of the invention enable the optimization of electric design of charging networks for electric vehicles. One embodiment includes an electrical supply; a plurality of adaptive charging stations; wherein at least one adaptive charging station distributes power to at least one other adaptive charging station; wherein at least one adaptive charging station is configured to communicate capacity information to a controller; and wherein the controller is configured to control the distribution of power to the plurality of adaptive charging stations based upon the capacity information received from at least one adaptive charging station.

22 Claims, 10 Drawing Sheets

(51) Int. Cl.
| | |
|---|---|
| *B60L 11/18* | (2006.01) |
| *H04B 3/54* | (2006.01) |
| *H02J 3/14* | (2006.01) |
| *B60L 53/68* | (2019.01) |
| *B60L 53/30* | (2019.01) |
| *B60L 53/63* | (2019.01) |
| *B60L 55/00* | (2019.01) |
| *H02J 7/00* | (2006.01) |
| *H02J 7/35* | (2006.01) |

(52) U.S. Cl.
CPC .............. *B60L 53/63* (2019.02); *B60L 53/67* (2019.02); *B60L 53/68* (2019.02); *B60L 55/00* (2019.02); *H02J 3/14* (2013.01); *H02J 13/0006* (2013.01); *H04B 3/54* (2013.01); *H02J 7/0027* (2013.01); *H02J 7/35* (2013.01); *H02J 13/00007* (2020.01); *H02J 13/0075* (2013.01); *Y02B 90/20* (2013.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/12* (2013.01); *Y04S 40/121* (2013.01); *Y04S 40/126* (2013.01)

(56) References Cited

U.S. PATENT DOCUMENTS

| | | |
|---|---|---|
| 7,076,360 B1 | 7/2006 | Ma |
| 7,852,050 B2 | 12/2010 | Berggren et al. |
| 8,013,570 B2 | 9/2011 | Baxter et al. |
| 8,346,401 B2 | 1/2013 | Pollack et al. |
| 8,407,016 B2 | 3/2013 | Slota et al. |
| 8,754,627 B1 * | 6/2014 | Le .............................. G05F 1/67 323/299 |
| 8,972,074 B2 | 3/2015 | Marasanapalle et al. |
| 9,024,580 B2 | 5/2015 | Wu et al. |
| 9,093,844 B2 | 7/2015 | Yonezawa et al. |
| 9,112,382 B2 | 8/2015 | Aisu et al. |
| 9,148,027 B2 | 9/2015 | Shane et al. |
| 9,153,966 B2 | 10/2015 | Ishida |
| 9,168,841 B2 | 10/2015 | Kawai et al. |
| 9,225,171 B2 | 12/2015 | Chen et al. |
| 9,248,755 B2 | 2/2016 | Sun et al. |
| 9,335,748 B2 | 5/2016 | Francino et al. |
| 9,418,318 B2 | 8/2016 | Nadar et al. |
| 9,564,757 B2 | 2/2017 | Wang et al. |
| 9,703,308 B2 | 7/2017 | Claessens et al. |
| 9,760,957 B2 | 9/2017 | Hug et al. |
| 9,863,985 B2 | 1/2018 | Giannakis et al. |
| 9,954,362 B2 | 4/2018 | Low et al. |
| 10,065,520 B2 | 9/2018 | Zhang et al. |
| 10,158,229 B2 | 12/2018 | Gan et al. |
| 10,198,018 B2 | 2/2019 | Gan et al. |
| 10,320,203 B2 | 6/2019 | Low et al. |
| 2008/0005597 A1 | 1/2008 | Kern et al. |
| 2008/0077368 A1 | 3/2008 | Nasle |
| 2008/0281663 A1 | 11/2008 | Hakim et al. |
| 2009/0261779 A1 * | 10/2009 | Zyren .................... G06Q 50/06 320/109 |
| 2010/0134067 A1 * | 6/2010 | Baxter .................... B60L 3/0084 320/109 |
| 2010/0217550 A1 | 8/2010 | Crabtree et al. |
| 2010/0280675 A1 * | 11/2010 | Tate, Jr. ................. H01M 10/44 700/295 |
| 2011/0043220 A1 | 2/2011 | Leibowitz et al. |
| 2011/0153474 A1 | 6/2011 | Tormey et al. |
| 2011/0169461 A1 * | 7/2011 | Deaver, Sr. .............. G05F 1/70 323/209 |
| 2012/0029720 A1 | 2/2012 | Cherian et al. |
| 2012/0044843 A1 * | 2/2012 | Levy ................ H02J 7/00036 370/310 |
| 2012/0049793 A1 | 3/2012 | Ross |
| 2012/0074893 A1 * | 3/2012 | Cole ........................ H02J 7/35 320/101 |
| 2012/0098481 A1 | 4/2012 | Hunter et al. |
| 2012/0180064 A1 | 7/2012 | Helander |
| 2012/0200160 A1 | 8/2012 | Pratt et al. |
| 2012/0200256 A1 | 8/2012 | Tse |
| 2012/0203388 A1 | 8/2012 | DiLuciano et al. |
| 2012/0316691 A1 | 12/2012 | Boardman et al. |
| 2012/0326503 A1 | 12/2012 | Birkelund et al. |
| 2013/0020993 A1 * | 1/2013 | Taddeo .................. H02J 7/0027 320/109 |
| 2013/0057210 A1 | 3/2013 | Nergaard et al. |
| 2013/0110296 A1 | 5/2013 | Khoo |
| 2013/0201316 A1 | 8/2013 | Binder et al. |
| 2013/0211988 A1 * | 8/2013 | Dorn ...................... B60L 11/1838 705/35 |
| 2013/0238148 A1 | 9/2013 | Legbedji et al. |
| 2013/0268131 A1 | 10/2013 | Venayagamoorthy et al. |
| 2013/0274941 A1 | 10/2013 | Khozikov et al. |
| 2014/0025352 A1 | 1/2014 | Ghosh et al. |
| 2014/0032007 A1 | 1/2014 | Claessens et al. |
| 2014/0060065 A1 | 3/2014 | Sweet et al. |
| 2014/0070606 A1 | 3/2014 | Gibeau |
| 2014/0089016 A1 | 3/2014 | Smullin et al. |
| 2014/0097683 A1 | 4/2014 | Piyabongkarn et al. |
| 2014/0125280 A1 | 5/2014 | Sun et al. |
| 2014/0167985 A1 * | 6/2014 | Halnais ................ B60L 11/1816 340/901 |
| 2014/0232337 A1 | 8/2014 | Namou et al. |
| 2014/0266042 A1 * | 9/2014 | Storm ...................... B60L 53/60 320/109 |
| 2014/0312839 A1 | 10/2014 | Uyeki |
| 2014/0316604 A1 | 10/2014 | Ortjohann et al. |
| 2014/0379157 A1 | 12/2014 | Das et al. |
| 2015/0009047 A1 * | 1/2015 | Ashkenazi ............. G08G 1/144 340/932.2 |
| 2015/0025696 A1 | 1/2015 | Hug et al. |
| 2015/0051744 A1 | 2/2015 | Mitra |
| 2015/0120109 A1 | 4/2015 | Cun |
| 2015/0137768 A1 | 5/2015 | Kishiyama et al. |
| 2015/0165924 A1 | 6/2015 | Cho et al. |
| 2015/0291044 A1 | 10/2015 | Adachi et al. |
| 2015/0340863 A1 | 11/2015 | Qiuyu et al. |
| 2015/0346698 A1 * | 12/2015 | Mailloux ............... H02J 7/0013 307/31 |
| 2015/0346753 A1 | 12/2015 | Gan et al. |
| 2015/0367740 A1 | 12/2015 | Mcgrath et al. |
| 2016/0009192 A1 | 1/2016 | Zhang et al. |
| 2016/0031338 A1 | 2/2016 | Penilla et al. |
| 2016/0036225 A1 | 2/2016 | Zhao et al. |
| 2016/0036226 A1 | 2/2016 | Gan et al. |
| 2016/0047862 A1 | 2/2016 | Shimizu et al. |
| 2016/0121748 A1 * | 5/2016 | Wytock ................ B60L 11/1824 320/109 |
| 2016/0214489 A1 | 7/2016 | Giusti et al. |
| 2016/0248254 A1 | 8/2016 | huomo et al. |
| 2016/0254669 A1 | 9/2016 | Zhang et al. |
| 2016/0315807 A1 | 10/2016 | Peng et al. |
| 2017/0110895 A1 | 4/2017 | Low et al. |
| 2019/0184850 A1 | 6/2019 | Lee et al. |
| 2020/0254896 A1 | 8/2020 | Lee et al. |

FOREIGN PATENT DOCUMENTS

| | | |
|---|---|---|
| GB | 2505929 A | 3/2014 |
| JP | 2012034452 A | 2/2012 |
| JP | 2012083989 A | 4/2012 |
| KR | 1020120075010 B1 | 1/2013 |
| KR | 101566715 B1 | 11/2015 |
| WO | 2012015507 A1 | 2/2012 |
| WO | 2012058114 A2 | 5/2012 |
| WO | 2012167383 A1 | 12/2012 |
| WO | 2014075108 A2 | 5/2014 |
| WO | 2015179873 A1 | 11/2015 |
| WO | 2015184188 A1 | 12/2015 |
| WO | 2016007910 A1 | 1/2016 |
| WO | 2016022603 A1 | 2/2016 |

(56) References Cited

FOREIGN PATENT DOCUMENTS

| WO | 2016172348 A1 | 10/2016 |
|---|---|---|
| WO | 2017066790 A1 | 4/2017 |
| WO | 2017147612 A1 | 8/2017 |
| WO | 2019109084 A1 | 6/2019 |
| WO | 2020163873 A1 | 8/2020 |

OTHER PUBLICATIONS

"Electric Vehicle Public Charging—Time vs. Energy", U.S. Department of Energy, The EV Project, Mar. 2013, 4 pages.
"High level analysis of the plugged-in places chargepoint usage data", UK Office of Low Emission Vehicles, Sep. 4, 2013, retrieved from https://www.gov.uk/government/publications/high-level-analysis-of-the-plugged-in-places-chargepoint-usage-data, 34 pages.
Alsac et al., "Further developments in LP-based optimal power flow", IEEE Transactions on Power Systems, vol. 5, Issue 3, Aug. 1990, pp. 697-711.
Bernardo, "Fast Charging Stations: Network Planning versus Free Entry", Apr. 22, 2013, 14 pages.
Bitar et al., "Deadline differentiated pricing of deferrable electric power service", 2012 IEEE 51st IEEE Conference on Decision and Control (CDC), Dec. 10-13, 2012, Maui, HI, USA, pp. 4991-4997.
Bitar et al., "Deadline differentiated pricing of delay-tolerant demand", arXiv:1407.1601 [math.OC], Jan. 20, 2015.
Carpentier, J., "Contribution to the economic dispatch problem", Bulletin de la Societe Francoise des Electriciens, vol. 3, No. 8, 1962, pp. 431-447.
Chang et al., "Financial Viability of Non-Residential Electric Vehicle Charging Stations", Technical report, Luskin Center, Anderson School of Management, UCLA, Aug. 2012, 51 pages.
Chen et al., "iEMS for large scale charging of electric vehicles: Architecture and optimal online scheduling", 2012 IEEE Third International Conference on Smart Grid Communications (SmartGridComm), Nov. 5-8, 2012, Tainan, Taiwan, pp. 629-634.
Chen et al., "Optimizing Operations for Large Scale Charging of Electric Vehicles", 2013 46th Hawaii International Conference on System Sciences, Jan. 7-10, 2013, Wailea, Maui, HI, USA, pp. 2319-2326.
Clement-Nyns et al., "The Impact of Charging Plug-In Hybrid Electric Vehicles on a Residential Distribution Grid", IEEE Transactions on Power Systems, vol. 25, Issue 1, Feb. 2010, pp. 371-380.
Dommel et al., "Optimal Power Flow Solutions", IEEE Transactions on Power Apparatus and Systems, vol. PAS-87, Issue 10, Oct. 1968, pp. 1866-1876.
Frade et al., "Optimal Location of Charging Stations for Electric Vehicles in a Neighborhood in Lisbon, Portugal", Transportation Research Record: Journal of the Transportation Research Board, No. 2252, 2011, pp. 91-98.
Gan et al., "Optimal decentralized protocol for electric vehicle charging", 2011 50th IEEE Conference on Decision and Control and European Control Conference, Dec. 12-15, 2011, Orlando, FL, USA, pp. 5798-5804.
Gan et al., "Optimal decentralized protocol for electric vehicle charging", IEEE Transactions on Power Systems, vol. 28, Issue 2, May 2013, pp. 940-951.
Ge et al., "The Planning of Electric Vehicle Charging Stations in the Urban Area", 2nd International Conference on Electronic & Mechanical Engineering and Information Technology (EMEIT-2012), Nov. 2012, pp. 1598-1604, doi:10.2991/emeit.2012.356.
He et al., "Optimal deployment of public charging stations for plug-in hybrid electric vehicles", Transportation Research Part B: Methodological, vol. 47, Jan. 2013, pp. 87-101.
Low, "Convex Relaxation of Optimal Power Flow—Part II: Exactness", IEEE Transactions on Control of Network Systems, Jun. 2014, vol. 1, No. 2, pp. 177-189.
Low, "Convex Relaxation of Optimal Power Flow Part I: Formulations and Equivalence", IEEE Trans. on Control of Network Systems, Apr. 15, 2014, vol. 1, No. 1, pp. 15-17 Retrieved from the Internet: http://arxiv.org/pdf/1405, published May 5, 2014, 44 pgs.

Ma et al., "Decentralized charging control for large populations of plug-in electric vehicles", 49th IEEE Conference on Decision and Control (CDC), Dec. 15-17, 2010, Atlanta, GA, USA, pp. 206-212.
Ma et al., "Decentralized Charging Control of Large Populations of Plug-in Electric Vehicles", IEEE Transactions on Control Systems Technology, vol. 21, Issue 1, Jan. 2013, pp. 67-78.
Overbye et al., "A comparison of the AC and DC power flow models for LMP calculations", 37th Annual Hawaii International Conference on System Sciences, Jan. 5-8, 2004, Big Island, HI, USA, 9 pages.
Purchala et al., "Usefulness of DC power flow for active power flow analysis", IEEE Power Engineering Society General Meeting, Jun. 16, 2005, San Francisco, CA, USA, pp. 454-459.
Stott, B. et al., "DC power flow revisited", IEEE Transactions on Power Systems, Aug. 2009, vol. 24, No. 3, pp. 1290-1300.
Stott, B. et al., "Fast decoupled load flow", IEEE Transactions on Power Apparatus and Systems, May 1974, vol. PAS-93, No. 3, pp. 859-869.
Wang et al., "EV charging algorithm implementation with user price preference", 2015 IEEE Power & Energy Society Innovative Smart Grid Technologies Conference (ISGT), Feb. 18-20, 2015, Washington, DC, USA, pp. 1-5.
Wang et al., "Event-based electric vehicle scheduling considering random user behaviors", 2015 IEEE International Conference on Smart Grid Communications (SmartGridComm), Nov. 2-5, 2015, Miami, FL, USA, pp. 313-318.
Yu et al., "On market dynamics of electric vehicle diffusion", 2014 52nd Annual Allerton Conference on Communication, Control, and Computing (Allerton), Sep. 30-Oct. 3, 2014, Monticello, IL, USA, pp. 1051-1057.
International Search Report and Written Opinion for International Application No. PCT/US2017/019787, Search completed May 24, 2017, dated May 24, 2017, 15 pages.
International Preliminary Report on Patentability for International Application PCT/US2016/057398, Report issued Apr. 17, 2018, dated Apr. 26, 2018, 6 Pgs.
International Preliminary Report on Patentability for International Application PCT/US2017/019787, Report issued Aug. 28, 2018, dated Sep. 7, 2018, 11 Pgs.
Hutson et al., "Intelligent Scheduling of Hybrid and Electric Vehicle Storage Capacity in a Parking Lot for Profit Maximization in Grid Power Transactions", 2008 IEEE Energy 2030 Conference, Atlanta, GA, USA, Nov. 17-18, 2008, pp. 1-8, DOI: 10.1109/ENERGY. 2008.4781051.
Zhang et al., "An Improved Least-Laxity-First Scheduling Algorithm of Variable Time Slice for Periodic Tasks", 6th IEEE International Conference on Cognitive Informatics, Lake Tahoe, CA, USA, Aug. 6-8, 2007, pp. 548-553, DOI: 10.1109/COGINF.2007. 4341935.
International Preliminary Report on Patentability for International Application PCT/US2015/032482, Report issued Nov. 29, 2016, dated Dec. 8, 2016, 12 Pgs.
International Preliminary Report on Patentability for International Application PCT/US2015/033055, Report issued Nov. 29, 2016, dated Dec. 8, 2016, 8 Pgs.
International Preliminary Report on Patentability for International Application PCT/US2015/040031, Report issued Jan. 10, 2017, dated Jan. 10, 2017, 7 Pgs.
International Preliminary Report on Patentability for International Application PCT/US2015/043676, Report issued Feb. 7, 2017, dated Feb. 16, 2017, 6 Pgs.
International Preliminary Report on Patentability for International Application PCT/US2016/028659, Report issued Oct. 24, 2017, dated Nov. 2, 2017, 10 Pgs.
International Search Report and Written Opinion for International Application PCT/US2015/033055, Report Completed Sep. 9, 2015, dated Sep. 9, 2015, 11 Pgs.
International Search Report and Written Opinion for International Application PCT/US2015/040031, Report Completed Sep. 24, 2015, dated Sep. 24, 2015, 9 Pgs.
International Search Report and Written Opinion for International Application No. PCT/US2015/043676, Search completed Oct. 27, 2015, dated Oct. 27, 2015, 8 Pgs.

(56) References Cited

OTHER PUBLICATIONS

International Search Report and Written Opinion for International Application No. PCT/US2016/028659, Search completed Jul. 27,2016, dated Jul. 28, 2016, 12 Pgs.
International Search Report and Written Opinion for International Application No. PCT/US2018/063637, Search completed Apr. 1, 2019, dated Apr. 1, 2019, 9 Pgs.
International Search Report and Written Opinion for International Application PCT/US2015/032482, Report Completed Sep. 9, 2015, dated Sep. 9, 2015, 15 pgs.
"Dynamic demand control of domestic appliances", U. K. Market Transformation Program, Market Transformation Programme, Tech. Rep., 2008, published Nov. 30, 2010, 22 pages.
"IEEE distribution test feeders", modified Aug. 5, 2013, online at available at http://ewh.ieee.org/soc/pes/ dsacom/testfeeders/, retrieved Jul. 10, 2017, 3 pgs.
Andreasson et al., "Distributed Control of Networked Dynamical Systems: Static Feedback, Integral Action and Consensus", IEEE Transactions on Automatic Control, vol. 59, Issue 7, Jul. 2014, pp. 1750-1764.
Andreasson et al., "Distributed vs. centralized power systems frequency control", 2013 European Control Conference (ECC), Jul. 17-19, 2013, Zurich, Switzerland, pp. 3524-3529.
Araposthatis et al., "Analysis of power-flow equation", International Journal of Electrical Power & Energy Systems, vol. 3, Issue 3, Jul. 1981, pp. 115-126.
Bacciotti et al., "Nonpathological Lyapunov functions and discontinuous Caratheodory systems", Automatica, vol. 42, Issue 3, Mar. 31, 2006, pp. 453-458.
Bai et al., "Semidefinite programming for optimal power flow problems", Electrical Power and Energy Systems, 2008, vol. 30, pp. 383-392.
Baldick, R. et al., "A fast distributed imple-mentation of optimal power flow", IEEE Transactions on Power Systems, vol. 14, Issue 3, Aug. 1999, pp. 858-864.
Baptista, E. C. et al., "Logarithmic barrier-augmented lagrangian function to the optimal power flow problem", Electrical Power and Energy Systems, Jun. 23, 2005, vol. 27, No. 7, pp. 528-532.
Baran, M. E. et al., "Network reconfiguration in distribution systems for loss reduction and load balancing", IEEE Transactions on Power Delivery, Apr. 1989, vol. 4, No. 2, pp. 1401-1407.
Baran et al., "Optimal Capacitor Placement on radial distribution systems", IEEE Transactions on Power Deliver, vol. 4, Issue 1, Jan. 1989, pp. 725-734.
Baran et al., "Optimal Sizing of Capacitors Placed on a Radial Distribution System", IEEE Transactions on Power Delivery, vol. 4, Issue 1, Jan. 1989, pp. 735-743.
Berg et al., "Mechanized Calculation of Unbalanced Load Flow on Radial Distribution Circuits", IEEE Transactions on Power Apparatus and Systems, vol. PAS-86, Issue 4, Apr. 1967, pp. 415-421.
Bergen et al., "Structure preserving model for power system stability analysis", IEEE Transactions on Power Apparatus and Systems, vol. PAS-100, No. 1, 1981, pp. 25-35.
Boyd et al., "Convex Optimization", Cambridge University Press, 2004, 703 pages.
Boyd et al., "Distributed Optimization and Statistical Learning via the Alternating Direction Method of Multipliers", Foundations and Trends in Machine Learning, vol. 3, No. 1, 2010, pp. 1-122.
Brooks et al., "Demand Dispatch", IEEE Power and Energy Magazine, vol. 8, Issue 3, May-Jun. 2010, pp. 20-29.
Burger et al., "An internal model approach to (optimal) frequency regulation in power grids", arXiv:1403.7019, Mar. 27, 2014, 14 pages.
Cain et al., "History of optimal power flow and formulations; Optimal Power Flow Paper 1", Federal Energy Regulatory Commission, Dec. 2012, 36 pgs.
Callaway et al., "Achieving Controllability of Electric Loads", Proceedings of the IEEE, vol. 99, Issue 1, Jan. 2011, pp. 184-199.

Capitanescu, F. et al., "Interior-point based algorithms for the solution of optimal power flow problems", Electric Power Systems Research, vol. 77, Issues 5-6, Apr. 2007, pp. 508-517, https://doi.org/10.1016/j.epsr.2006.05.003.
Castillo et al., "Survey of approaches to solving the ACOPF; Optimal Power Flow Paper 4", Federal Energy Regulatory Commission, Mar. 2013, 49 pgs.
Chen et al., "Distribution system power flow analysis—a rigid approach", IEEE Transactions on Power Delivery, vol. 6, Issue 3, Jul. 1991, pp. 1146-1152.
Cheng et al., "Three-Phase Power Flow Method for Real-Time Distribution System Analysis", IEEE Transactions on Power Systems, vol. 10, May 1995, 9 pages.
Cherukuri et al., "Asymptotic convergence of constrained primal-dual dynamics", Systems & Control Letters, vol. 87, Jan. 31, 2016, pp. 10-15.
Cheung et al., "Power System Toolbox Version 3.0", Rensselaer Polytechnic Institute and Cherry Tree Scientific Software, 2009, 123 pages.
Chow et al., "A toolbox for power system dynamics and control engineering education and research", IEEE Transactions on Power Systems, vol. 7, Issue 4, Nov. 1992, pp. 1559-1564.
Contaxis, G. C. et al., "Decoupled Optimal Load Flow Using Linear or Quadratic Programming", IEEE Transactions on Power Systems, vol. 1, Issue 2, May 1986, pp. 1-7.
Dall'anese et al., "Distributed Optimal Power Flow for Smart Microgrids", EEE Transactions on Smart Grid, arXiv:1211.5856v5, Jan. 25, 2014, pp. 1-11, Retrieved from the Internet: http://arxiv.org/pdf/1211.5856.pdf>.
Dall'anese et al., "Distributed Optimal Power Flow for Smart Microgrids", IEEE Transactions on Smart Grid, vol. 4, Issue 3, Sep. 2013, pp. 1464-1475.
Devane, E. et al., "Stability and convergence of distributed algorithms for the OPF problem", 52nd IEEE Conference on Decision and Control, Dec. 10-13, 2013, Florence, Italy, pp. 2933-2938.
Donnelly et al., "Frequency and stability control using decentralized intelligent loads: Benefits and pitfalls", IEEE PES General Meeting, Jul. 25-29, 2010, Providence, RI, USA, pp. 1-6.
Dorfler et al., "Breaking the Hierarchy: Distributed Control and Economic Optimality in Microgrids", IEEE Transactions on Control of Network Systems, vol. 3, Issue 3, Sep. 2016, pp. 241-253.
Dorfler et al., "Plug-and-Play Control and Optimization in Microgrids", 53rd IEEE Conference on Decision and Control, Dec. 15-17, 2014, Los Angeles, CA, USA, pp. 211-216.
Dupuis, "Dynamical systems and variational inequalities", Annals of Operations Research, vol. 44, No. 1, Feb. 28, 1993, pp. 7-42.
Farivar, M. et al., "Branch flow model: relaxations and convexification (parts I, II)", IEEE Trans. on Power Systems, Aug. 2013, vol. 28, No. 3, pp. 2554-2572.
Farivar, M. et al., "Inverter VAR control for distribution systems with renewables", In IEEE SmartGridComm, Oct. 17-20, 2011, pp. 457-462.
Farivar, M. et al., "Optimal Inverter VAR Control in Distribution Systems with High PV Penetration", In PES General Meeting, Jul. 22-26, 2012, pp. 1-7.
Farivar et al., "Branch Flow Model relaxations, convexification", Computing + Math Sciences Electrical Engineering, Caltech, May 2012, 69 pages.
Feijer et al., "Stability of primal-dual gradient dynamics and applications to network optimization", Automatica, vol. 46, Issue 12, Dec. 2010, pp. 1974-1981.
Frank et al., "Optimal power flow: a bibliographic survey I, Formulations and deterministic methods", Energy Systems, 2012, vol. 3, No. 3, pp. 221-258.
Fukuda et al., "Exploiting Sparsity in Semidefinite Programming Via Matrix Completion I: General Framework", SIAM Journal on Optimization, 2001, vol. 11, No. 3, pp. 647-674.
Gan, L. et al., "Convex Relaxations and Linear Approximation for Optimal Power Flow in Multiphase Radial Networks", In Power systems computation conference, Aug. 18-22, 2014, 9 pgs.
Gan et al., "Exact Convex Relaxation of Optimal Power Flow in Radial Networks", IEEE Transactions on Automatic Control, vol. 60, Issue 1, Jan. 2015, pp. 72-87.

(56) References Cited

OTHER PUBLICATIONS

Gan et al., "Optimal power flow in distribution networks", Proc. 52nd IEEE Conference on Decision and Control, Dec. 2013, in arXiv:12084076, 7 pgs.

Grant, M. et al., "Cvx: Matlab software for disciplined convex programming", online at http://cvxr.com/cvx/, 2008, 2 pgs.

Guo et al., "Nonlinear decentralized control of large-scale power systems", Automatica, vol. 36, Issue 9, Sep. 2000, pp. 1275-1289.

Hammerstrom et al., "Pacific Northwest GridWise Testbed Demonstration Projects Part II. Grid Friendly Appliance Project", Pacific Northwest National Laboratory, Technical Report No. PNNL-17079, Oct. 2007, 123 pages.

Hill et al., "Stability analysis of multimachine power networks with linear frequency dependent loads", IEEE Transactions on Circuits and Systems, vol. 29, Issue 12, Dec. 1982, pp. 840-848.

Huneault et al., "A survey of the optimal power flow literature", IEEE Transactions on Power Systems, May 1991, vol. 6, No. 2, pp. 762-770.

ILIC, Marija D., "From Hierarchical to Open Access Electric Power Systems", Proceedings of the IEEE, vol. 95, Issue 5, May 2007, pp. 1060-1084.

Jabr, R. A. et al., "A primal-dual interior-point method to solve the optimal power flow dispatching problem", Optimization and Engineering, Feb. 12, 2003, vol. 4, No. 4, pp. 309-336.

Jabr et al., "Radial Distribution Load Flow Using Conic Programming", IEEE Transactions on Power Systems, Aug. 2006, vol. 21, Issue 3, pp. 1458-1459.

Jakobsson, Martin "On Some Extensions and Performance of Fast-Lipschitz Optimization", Master's Degree Project Stockholm, Sweden, Oct. 2011. Retrieved from the Internet: <http://www.divaportal.org/smash/get/diva2:471914/FULLTEXT01.pdf> See abstract, 84 pgs.

Jiang et al., "Toward a globally robust decentralized control for large-scale power systems", IEEE Transactions on Control Systems Technology, vol. 5, Issue 3, May 1997, pp. 309-319.

Kelly et al., "Rate Control for Communication Networks: Shadow Prices, Proportional Fairness and Stability", The Journal of the Operational Research Society, vol. 49, No. 3, Mar. 1998, p. 237-252.

Kersting, W. H., "Radial distribution test feeders", IEEE Transactions on Power Systems, vol. 6, Issue 3, Aug. 1991, pp. 975-985.

Kersting et al., "Distribution System Modeling and Analysis", CRC Press, 2006, 329 pgs. (presented in 3 parts).

Kiani et al., "A hierarchical transactive control architecture for renewables integration in Smart Grids", 2012 IEEE 51st IEEE Conference on Decision and Control (CDC), Dec. 10-13, 2012, Maui, HI, USA, pp. 4985-4990.

Kim, B. H. et al., "Coarse-grained distributed optimal power flow", IEEE Transactions on Power Systems, vol. 12, Issue 2, May 1997, pp. 932-939.

Kraning et al., "Dynamic Network Energy Management via Proximal Message Passing", Foundations and Trends in Optimization, 2013, vol. 1, pp. 70-122.

Lam, A. et al., "Optimal Distributed Voltage Regulation in Power Distribution Networks", arXiv:1204.5226, Apr. 23, 2012, retrieved from https://arxiv.org/abs/1204.5226v1, 24 pages.

Lam et al., "Distributed algorithms for optimal power flow problem", 2012 IEEE 51st IEEE Conference on Decision and Control (CDC), Dec. 10-13, 2012, Maui, HI, USA, pp. 430-437.

Lavaei et al., "Zero Duality Gap in Optimal Power Flow Problem", IEEE Transactions on Power Systems, vol. 27, Issue 1, Feb. 2012, pp. 92-107.

Li, N. et al., "Demand response in radial distribution networks: Distributed algorithm", 2012 Conference Record of the Forty Sixth Asilomar Conference on Signals, Systems and Computers (ASILOMAR), Nov. 4-7, 2012, Pacific Grove, CA, USA, pp. 1549-1553.

Li et al., "Connecting Automatic Generation Control and Economic Dispatch from an Optimization View", 2014 American Control Conference (ACC), Jun. 4-6, 2014, Portland, Oregon, USA, pp. 735-740.

Li et al., "Optimal demand response based on utility maximization in power networks", 2011 IEEE Power and Energy Society General Meeting, Jul. 24-29, 2011, Detroit, MI, USA, pp. 1-8.

Liu et al., "Decentralized Multi-Agent System-Based Cooperative Frequency Control for Autonomous Microgrids Wth Communication Constraints", IEEE Transactions on Sustainable Energy, vol. 5, Issue 2, Apr. 2014, pp. 446-456.

Low, S. H. et al., "Convex Relaxation of Optimal Power Flow Part I: Formulations and Equivalence", IEEE Transactions on Control of Network Systems, Mar. 2014, vol. 1, No. 1, pp. 15-27.

Low et al., "Optimization Flow Control-I: Basic Algorithm and Convergence", IEEE/ACM Transactions on Networking, vol. 7, Issue 6, Dec. 1999, pp. 861-874.

Lu et al., "Design Considerations for Frequency Responsive Grid Friendly Appliances", 2005/2006 IEEE/PES Transmission and Distribution Conference and Exhibition, May 21-24, 2006, Dallas, TX, USA, pp. 647-652.

Lu et al., "Nonlinear stabilizing control of multimachine systems", IEEE Transactions on Power Systems, vol. 4, Issue 1, Feb. 1989, pp. 236-241.

Lygeros et al., "Dynamical properties of hybrid automata", IEEE Transactions on Automatic Control, vol. 48, Issue 1, Jan. 31, 2003, pp. 2-17.

Mallada et al., "Distributed Frequency-Preserving Optimal Load Control", Proceedings of the 19th World Congress, IFAC Proceedings Volumes, vol. 47, Issue 3, Aug. 24-29, 2014, Cape Town, South Africa, pp. 5411-5418.

Mallada et al., "Fair load-side control for frequency regulation in smart grids", Proc. of Allerton Conference on Communication, Control, and Computing, Monticello, IL, USA, 2014, 10 pages.

Mallada et al., "Optimal load-side control for frequency regulation in smart grids", 2014 52nd Annual Allerton Conference on Communication, Control, and Computing (Allerton), Sep. 30, 2014-Oct. 3, 2014, pp. 731-738.

Min, W. et al., "A trust region interior point algorithm for optimal power flow problems", Electrical Power and Energy Systems, May 2005, vol. 27, No. 4, pp. 293-300.

Molina-Garcia et al., "Decentralized Demand-Side Contribution to Primary Frequency Control", IEEE Transactions on Power Systems, vol. 26, Issue 1, Feb. 2011, pp. 411-419.

Momoh et al., "A review of selected optimal power flow literature to 1993. Part I: Nonlinear and quadratic programming approaches", IEEE Transactions on Power Systems, Feb. 1999, vol. 14, No. 1, pp. 96-104.

Moon et al., "The development of equivalent system technique for deriving an energy function reflecting transfer conductances", IEEE Transactions on Power Systems, vol. 14, Issue 4, Nov. 1999, pp. 1335-1341.

O'Neill et al., "The IV Formulation and Linear Approximations of the AC Optimal Power Flow Problem", Optimal Power Flow Paper, 18 pages, Dec. 2012.

Ortega et al., "Transient stabilization of multimachine power systems with nontrivial transfer conductances", IEEE Transactions on Automatic Control, vol. 50, Issue 1, Jan. 2005, pp. 60-75.

Palomar et al., "A tutorial on decomposition methods for network utility maximization", IEEE Journal on Selected Areas in Communications, vol. 24, Issue 8, Aug. 2006, pp. 1439-1451.

Pandya et al., "A survey of optimal power flow methods", Journal of Theoretical and Applied Information Technology, 2008, vol. 4, No. 5, pp. 450-458.

Peng et al., "Distributed algorithm for optimal power flow on a radial network", 53rd IEEE Conference on Decision and Control, Dec. 15-17, 2014, Los Angeles, CA, USA, pp. 167-172.

Peng et al., "Feeder Reconfiguration in Distribution Networks Based on Convex Relaxation of OPF", IEEE Transactions on Power Systems, vol. 30, Issue 4, Jul. 2015, pp. 1793-1804.

Phan et al., "Distributed Methods for Solving the Security-Constrained Optimal Power Flow Problem", IEEE PES Innovative Smart Grid Technologies (ISGT), 2012, Jan. 16-20, 2012, 7 Pgs.

(56) References Cited

OTHER PUBLICATIONS

Qu et al., "Application of robust control to sustained oscillations in power systems", IEEE Transactions on Circuits and Systems I: Fundamental Theory and Applications, vol. 39, Issue 6, Jun. 1992, pp. 470-476.
Schweppe et al., "Homeostatic Utility Control", IEEE Transactions on Power Apparatus and Systems, vol. PAS-99, Issue 3, May 1980, pp. 1151-1163.
Shafiee et al., "Distributed Secondary Control for Islanded Microgrids—A Novel Approach", IEEE Transactions on Power Electronics, vol. 29, Issue 2, Feb. 2014, pp. 1018-1031.
Short et al., "Stabilization of Grid Frequency Through Dynamic Demand Control", IEEE Transactions on Power Systems, vol. 22, Issue 3, Aug. 2007, pp. 1284-1293.
Siljak et al., "Robust decentralized turbine/governor control using linear matrix inequalities", IEEE Transactions on Power Systems, vol. 17, Issue 3, Aug. 2002, pp. 715-722.
Simpson-Porco et al., "Stability, power sharing, & distributed secondary control in droop-controlled microgrids", 2013 IEEE International Conference on Smart Grid Communications (SmartGridComm), Oct. 21-24, 2013, Vancouver, BC, Canada, pp. 672-677.
Simpson-Porco et al., "Synchronization and power sharing for droop-controlled inverters in islanded microgrids", Automatica, vol. 49, Issue 9, Sep. 2013, pp. 2603-2611.
Sousa, A. A. et al., "Robust optimal power flow solution using trust region and interior methods", IEEE Transactions on Power Systems, May 2011, vol. 26, No. 2, pp. 487-499.
Srinivasa et al., "HERB: a home exploring robotic butler", Autonomous Robots, 2010, vol. 28, pp. 5-20.
Sturm, "Using SeDuMi 1.02, a matlab toolbox for optimization over symmetric cones", Optimization Methods and Software, Mar. 1999, vol. 11. No. 1-4, pp. 625—653.
Sun, A. X. et al., "Fully decentralized AC optimal power flow algorithms", 2013 IEEE Power & Energy Society General Meeting, Jul. 21-25, 2013, Vancouver, BC, Canada, pp. 1-5.
Tao, "Optimal Power Flow Via Quadratic Modeling", 194 pages, Dec. 2011.
Taylor et al., "Convex models of distribution system reconfiguration", IEEE Transactions on Power Systems, vol. 6, No. 1, Jan. 2007, pp. 1407-1413.
Topcu et al., "Compositional stability analysis based on dual decomposition", Proceedings of the 48h IEEE Conference on Decision and Control (CDC) held jointly with 2009 28th Chinese Control Conference, Dec. 15-18, 2009, Shanghai, China, pp. 1175-1180.
Torres, G. L. et al., "An interior-point method for nonlinear optimal power flow using voltage rectangular coordinates", IEEE Transactions on Power Systems, Nov. 1998, vol. 13, No. 4, pp. 1211-1218.
Trudnowski et al., "Power-System Frequency and Stability Control using Decentralized Intelligent Loads", 2005/2006 IEEE/PES Transmission and Distribution Conference and Exhibition, May 21-24, 2006, Dallas, TX, USA, pp. 1453-1459.
Tsolas et al., "A structure preserving energy function for power system transient stability analysis", IEEE Transactions on Circuits and Systems, vol. 32, Issue 10, Oct. 1985, pp. 1041-1049.
Turitsyn, K. et al., "Local control of reactive power by distributed photovoltaic generators", In IEEE SmartGridComm, Oct. 4-6, 2010, pp. 79-84.
Wang et al., "Robust decentralized control for multimachine power systems", IEEE Transactions on Circuits and Systems I: Fundamental Theory and Applications, vol. 45, Issue 3, Mar. 1998, pp. 271-279.
Xiao, Y. et al., "Power flow control approach to power systems with embedded FACTS devices", IEEE Transactions on Power Systems, Nov. 2002, vol. 17, No. 4, pp. 943-950.
You et al., "Reverse and forward engineering of frequency control in power networks", 53rd IEEE Conference on Decision and Control, Dec. 15-17, 2014, Los Angeles, CA, USA, pp. 191-198.
Zhang et al., "A real-time control framework for smart power networks with star topology", 2013 American Control Conference, Jun. 17-19, 2013, Washington, DC, USA, pp. 5062-5067.
Zhang et al., "Distributed dynamic feedback control for smart power networks with tree topology", 2014 American Control Conference, Jun. 4-6, 2014, Portland, OR, USA, pp. 1156-1161.
Zhang et al., "Geometry of feasible injection region of power networks", 2011 49th Annual Allerton Conference on Communication, Control, and Computing (Allerton), Sep. 28-30, 2011, pp. 1508-1515.
Zhao et al., "Design and Stability of Load-Side Primary Frequency Control in Power Systems", IEEE Transactions on Automatic Control, vol. 59, Issue 5, May 2014, pp. 1177-1189.
Zhao et al., "Power System Dynamics as Primal-Dual Algorithm for Optimal Load Control", arXiv:1305.0585, May 6, 2013, pp. 1-35.
Zhao et al., "Swing dynamics as primal-dual algorithm for optimal load control", 2012 IEEE Third International Conference on Smart Grid Communications (SmartGridComm), Nov. 5-8, 2012, Tainan, Taiwan, pp. 570-575.
International Search Report and Written Opinion for International Application No. PCT/US2020/017531, Search completed Mar. 30, 2020, dated May 4, 2020, 15 pgs.
Ardakanian et al., "Quantifying the Benefits of Extending Electric Vehicle Charging Deadlines with Solar Generation", 2014 IEEE International Conference on Smart Grid Communications (SmartGridComm, IEEE, Venice Italy), 6 pgs. https://doi.org/10.1109/SmartGridComm,2014.7007716.
Blair et al., "System Advisor Model (SAM) General Description (Version 2017.9.5)", Technical Report, NREL/TP-6A20-70414, May 2018, pp. 1-24.
California ISO, "What the duck curve tells us about managing a green grid", California Independent System Operator, 2016, 4 pgs.
Chen et al, "Electric Vehicle Charging in Smart Grid: Optimality and Valley-filling Algorithms", IEEE Journal of Selected Topics in Signal Processing, Dec. 8, 2014, vol. 6, 11 pgs.
Chen et al., "An Analysis of the Charging Characteristics of Electric Vehicles Based on Measured Data and Its Application", IEEE Access, vol. 6, 2018, pp. 24475-24487.
Choi et al., "General Service Time-of-Use Electric Vehicle Charging, Large Demand Metered", Aug. 2017, 10 pgs.
Chung et al., "Electric Vehicle User Behavior Prediction Using Hybrid Kernel Density Estimator", 2018 IEEE International Conference on Probabilistic Methods Applied to Power Systems (PMAPS), Jun. 24-28, 2018, pp. 1-6.
Clement-Nyns et al., "The Impact of Charging Plug-In Hybrid Electric Vehicles on a Residential Distribution Grid", IEEE Transactions on Power Systems, vol. 25, No. 1, Feb. 2010, pp. 371-380.
Coignard et al., "Clean Vehicles as an enabler for a clean electric grid", Environmental Research Letters, vol. 13, May 16, 2018, 8pgs., https://doi.org.10.1088/1748-9326/aabe97.
Cross et al., "My Electric Avenue: Integrating electric vehicles into the electrical networks", 6th Hybrid and Electric Vehicles Conference (HEVC 2016), Nov. 2-3, 2016, 6 pgs., DOI: 10.1049/cp.2016.0972.
De Hoog et al., "Optimal Charging of Electric Vehicles Taking Distribution Network Constraints Into Account", IEEE Transactions on Power Systems, vol. 30, No. 1, Jan. 2015, 11 pgs., ://doi.org/10.1109/TPWRS.2014.2318293.
Denholm et al., "Co-benefits of large scale plug-in hybrid electric vehicle and solar PV deployment", Journal of Power Sources, vol. 236, pp. 350-356, Aug. 15, 2013, https://doi.org/10.1016/j.jpowsour.2012.10.007.
Develder et al., "Quantifying flexibility in EV charging as DR potential: Analysis of two real-word data sets", 2016 IEEE International Conference on Smart Grid Communications (SmartGridComm), Sydney, Australia, Nov. 6-9, 2016, 6 pgs., DOI: 10.1109/SmartGridComm.2016.7778827.
Eirola et al., "Gaussian Mixture Models for Time Series Modelling, Forecasting, and Interpolations", Proceedings of the 12th International Symposium of Intelligent Data Analysis XII, vol. 8207, Oct. 2013, 12 pgs., DOI:10.1007/978-3-642-41398-8_15.
Engel et al., "Charging Ahead: Electric-Vehicle Infrastructure Demand", McKinsey Center for Future Mobility, Oct. 2018, retrieved from

(56) References Cited

OTHER PUBLICATIONS https://www.mckinsey.com/industries/automotive-and-assembly/our-insights/charging-ahead-electric-vehicle-infrastructure-demand, accessed: May 3, 2019, pp. 1-8.
Fitzgerald et al., "EVGO Fleet and Tariff Analysis, Phase 1: California", Rocky Mountain Institute, Mar. 2017, 31 pgs.
Flammini et al., "Statistical characterisation of the real transaction data gathered from electric vehicle charging stations", Electric Power Systems Research, vol. 166, Jan. 2019, pp. 136-150, DOI: 10.1016/j.epsr.2018.09.022.
Fu et al., "U.S. Solar Photovoltaic System Cost Benchmark: Q1 2018", Technical Report NREL/TP-6A20-72399, Nov. 2018, 63 pgs.
Gong et al., "Study of PEV Charging on Residential Distribution Transformer Life", IEEE Transactions on Smart Grid, vol. 3, No. 1, Mar. 2012, pp. 404-412, https://doi.org/10.1109/TSG.2011.2163650.
Iversen et al., "Optimal Charging of an Electric Vehicle Using a Markov Decision Process", arXiv.org, Oct. 25, 2013, Retrieved from: www.arxiv.org/abs/1310.6926v1, 30 pgs.
Jones-Albertus, "Confronting the Duck Curve: How to Address Over-Generation of Solar Energy", Department of Energy, Office of Energy Efficiency & Renewable Energy, Oct. 12, 2017, Retrieved from: https://www.energy.gov/eere/articles/confronting-duck-curve-how-address-over-generation-solar-energy on Mar. 28, 2020, 7 pgs.
Khaki et al., "A Hierarchical ADMM Based Framework for EV Charging Scheduling", 2018 IEEE/PES Transmission and Distribution Conference and Exposition (T&D), Apr. 16-19, 2018, 5 pgs., DOI: 10.1109/TDC.2018.8440531.
Lee et al., "ACN-Data: Analysis and Applications of an Open EV Charging Dataset", Proceedings of the Tenth International Conference on Future Energy Systems, e-Energy '19, Jun. 2019, 12 pgs.
Lee et al., "Adaptive charging network for electric vehicles", 2016 IEEE Global Conference on Signal and Information Processing (GlobalSIP), Dec. 7-9, 2016, 5 pgs.
Lee et al., "Large-Scale Adaptive Electric Vehicle Charging", IEEE International Conference on Communications, Control, and Computing Technologies for Smart Grids, Oct. 2018, 7 pgs., DOI: 10.1109/SmartGridComm.2018.8587550.
Lee et al., "ACN-Sim: Open-Source Simulator for Data-Driven Electric Vehicle Charging Research", 2019 IEEE International Conference on Communications, Control, and Computing Technologies for Smart Grids (SmartGridComm), Oct. 21-23, 2019, 6 pgs.
Lee et al., "Shared Solar-Powered EV Charging Stations: Feasibility and Benefits", 2016 Seventh International Green and Sustainable Computing Conference (IGSC), Nov. 7-9, 2016, pp. 1-8, DOI: 10.1109/IGCC.2016.7892600.
Lindsay et al., "Mixture Models: Theory, Geometry and Applications", NSF-CBMS Regional Conference Series in Probability and Statistics, vol. 5, 1995, pp. I-163, presented in 2 parts.
Lucas et al., "Indicator-Based Methodology for Assessing EV Charging Infrastructure Using Exploratory Data Analysis", Energies, vol. 11, No. 7, Article 1869, Jul. 18, 2018, pp. 1-18, DOI: 10.3390/en11071869.
Nakahira et al., "Smoothed Least-laxity-first Algorithm for EV Charging", Proceedings of the 8th International Conference on Future Energy Systems, e-Energy '17, May 2017, pp. 1-10.
Nichols et al., "General Service Time-of-Use Electric Vehicle Charging Demand Metered", Mar. 2019, 7 pgs.
Pecan Street Inc., "Dataport", Retrieved from: https://pecanstreet.org/dataport/about/, 2019, 3 pgs.
Pedregosa et al., "Scikit-learn: Machine Learning in Python", Journal of Machine Learning Research, vol. 12, Oct. 2011, pp. 2825-2830.
Putrus et al., "Impact of electric vehicles on power distribution networks", 2009 IEEE Vehicle Power and Propulsion Conference, Sep. 7-10, 2009, 5 pgs., DOI: 10.1109/VPPC.2009.5289760.
Ramanujam et al., "Quantifying the Impact of Electric Vehicles on the Electric Grid—A Simulation Based Case-Study", Proceedings of the Eighth International Conference on Future Energy Systems, e-Energy '17, May 2017, pp. 228-233, https://doi.org/10.1145/3077839.3077854.
Rezaei et al., "Packetized Plug-In Electric Vehicle Charge Management", IEEE Transactions on Smart Grid, vol. 5, No. 2, Mar. 2014, 9 pgs., DOI:10.1109SG/TSG.2013.2281384.
Rivera et al., "Distributed Convex Optimization for Electric Vehicle Aggregators", IEEE Transactions on Smart Grid, vol. 8, No. 4, Jul. 2017, pp. 1852-1863, DOI: 10.1109/TSG.2015.2509030.
Rotering et al., "Optimal Charge Control of Plug-In Hybrid Electric Vehicles in Deregulated Electricity Markets", IEEE Transactions on Power Systems, vol. 26, No. 3, Aug. 2011, pp. 1021-1029.
Schuller et al., "Quantifying load flexibility of electric vehicles for renewable energy integration", Applied Energy, vol. 151, Aug. 1, 2015, pp. 335-344, DOI: 10.1016/j.apenergy.2015.04.004.
Tang et al., "A Model Predictive Control Approach for Low-Complexity Electric Vehicle Charging Scheduling: Optimality and Scalability", IEEE Transactions on Power Systems, vol. 32, No. 2, Mar. 2017, pp. 1050-1063, retrieved from arXiv:1502.01456, 13 pgs.
Wang et al., "Predictive Scheduling Framework for Electric Vehicles with Uncertainties of User Behaviors", IEEE Internet of Things Journal, vol. 4, No. 1, Feb. 2017, pp. 52-63, DOI: 10.1109/JIOT.2016.2617314.
Wang et al., "Smart Charging for Electric Vehicles: A Survey From the Algorithmic Perspective", IEEE Communications Surveys & Tutorials, vol. 18, No. 2, Jan. 14, 2016, pp. 1500-1517, retrieved from arXiv:1607.07298v1, 18 pgs.
Wu et al., "Two-Stage Energy Management for Office Buildings With Workplace EV Charging and Renewable Energy", IEEE Transactions on Transportation Electrification, vol. 3, No. 1, Mar. 2017, pp. 225-237, DOI: 10.1109/TTE.2017.2659626.
International Preliminary Report on Patentability for International Application No. PCT/US2018/063637, Report issued Jun. 2, 2020, dated Jun. 11, 2020, 7 Pgs.
Extended Search Report for European Application No. 18884678.6, Search completed Jul. 12, 2021, dated Jul. 26, 2021, 10 Pgs.
International Preliminary Report on Patentability for International Application No. PCT/US2020/017531, Report issued Aug. 10, 2021, dated Aug. 19, 2021, 9 Pgs.

* cited by examiner

ADAPTIVE CHARGING NETWORK USING ADAPTIVE CHARGING STATIONS FOR ELECTRIC VEHICLES

CROSS-REFERENCE TO RELATED APPLICATIONS

The current application claims priority to U.S. Provisional Patent Application Ser. No. 62/299,957 entitled "Adaptive Charging Network using Adaptive Charging Stations for Electric Vehicles" to George S. Lee et al., filed Feb. 25, 2016. The disclosure of U.S. Provisional Patent Application Ser. No. 62/299,957 is herein incorporated by reference in its entirety.

FIELD OF THE INVENTION

The present invention generally relates to electric vehicles and more specifically relates to adaptive charging station optimization for electric vehicles.

BACKGROUND

An incredible amount of infrastructure is relied upon to transport electricity from power stations, where the majority of electricity is currently generated, to where it is consumed by individuals. Power stations can generate electricity in a number of ways including using fossil fuels or using renewable energy sources such as solar, wind, and hydroelectric sources. Substations typically do not generate electricity, but can change the voltage level of the electricity as well as provide protection to other grid infrastructure during faults and outages. From here, the electricity travels over distribution lines to bring electricity to locations where it is consumed such as homes, businesses, and schools. The term "smart grid" describes a new approach to power distribution which leverages advanced technology to track and manage the distribution of electricity. A smart grid applies upgrades to existing power grid infrastructure including the addition of more renewable energy sources, advanced smart meters that digitally record power usage in real time, and bidirectional energy flow that enables the generation and storage of energy in additional places along the electric grid.

Electric vehicles (EVs), which include plug-in hybrid electric vehicles (PHEVs), can use an electric motor for propulsion. EV adoption has been spurred by federal, state, and local government policies providing various incentives (e.g. rebates, fast lanes, parking, etc.). Continued EV adoption is likely to have a significant impact on the future smart grid due to the additional stress load that EVs add to the grid (an EV's power demand can be many times that of an average residential house).

SUMMARY OF THE INVENTION

Adaptive charging networks in accordance with embodiments of the invention enable the optimization of electric design of charging networks for electric vehicles. One embodiment includes an electrical supply; a plurality of adaptive charging stations; wherein at least one adaptive charging station distributes power to at least one other adaptive charging station; wherein at least one adaptive charging station is configured to communicate capacity information to a controller; and wherein the controller is configured to control the distribution of power to the plurality of adaptive charging stations based upon the capacity information received from at least one adaptive charging station.

In further embodiment, the at least one adaptive charging station that distributes power to at least one other adaptive charging station: receives a high voltage supply and includes a transformer that steps down the high voltage supply; and distributes the stepped down high voltage supply to at least one other adaptive charging station.

In a still further embodiment, the at least one adaptive charging station is configured to communicate capacity information in accordance with an energy discovery protocol process performed by the plurality of adaptive charging stations.

In another embodiment, at least one of the plurality of adaptive charging stations is configured to communicate capacity information via power line communications.

In a still another embodiment, at least one of the plurality of adaptive charging stations is configured to communicate capacity information via wireless communication.

In a yet further embodiment, at least one of the plurality of adaptive charging stations comprises a sensor configured to detect the presence of a vehicle within a parking space, when the vehicle is not charging.

In a further embodiment again, the at least one of the plurality of adaptive charging stations that comprises a sensor configured to detect the presence of a vehicle within a parking space is further configured to communicate parking space occupancy information to a web gateway from which the parking space occupancy information can be retrieved via an application programming interface.

In a further additional embodiment, at least one of the plurality of adaptive charging stations comprises a touch screen user interface configured to receive information concerning charging requirements of an electric vehicle.

In another additional embodiment, the controller is configured to control the distribution of power to the plurality of adaptive charging stations based upon the capacity information received from at least one adaptive charging station using linear programming.

In a still yet further embodiment, at least one of the plurality of adaptive charging stations comprises a touch screen user interface configured to receive information concerning charging requirements of an electric vehicle including information indicative of a power requirement and an associated charging time; and the controller solves the linear program based upon the capacities of the plurality of adaptive charging stations, and at least one power requirement and an associated charging time.

In still another embodiment again, further comprising a plurality of power sources.

Still another further embodiment includes: the plurality of power sources comprises at least one selected from the group consisting of: an electric panel; a photovoltaic array; and a battery.

An adaptive charging station in accordance with an embodiment of the invention, comprising: an input configured to receive a high voltage power supply; a transformer configured to step down a high voltage power supply to a create a stepped down power supply; at least one output configured to distribute the stepped down power supply; a network interface; a processor a memory containing: an energy distribution application; wherein the processor is configured by the energy distribution application to: generate a stepped down voltage from a high voltage power supply received via the input using the transformer; and distribute the stepped down voltage to a downstream adaptive charging station in the network.

In yet another embodiment, the energy distribution application further configures the processor to transmit capacity information via the network interface.

In a further embodiment again, the energy distribution application further configures the processor to receive capacity information via the network interface.

In another embodiment again, the energy distribution application further configures the processor to generate a stepped down voltage based upon capacity information received via the network interface.

In a still yet further embodiment, a sensor configured to detect the presence of a vehicle within a parking space, when the vehicle is not charging.

In still yet another embodiment, the energy distribution application configures the processor to communicate parking space occupancy information to a web gateway from which the parking space occupancy information can be retrieved via an application programming interface.

In a still further embodiment again, a touch screen user interface configured to receive information concerning charging requirements of an electric vehicle.

In still another embodiment again, the charging requirements include information indicative of a power requirement and an associated charging time.

An adaptive charging station in accordance with an embodiment of the invention, comprising: an input configured to receive a power supply; an output for providing power to an electric vehicle; a network interface; a processor; a touch screen user interface configured to receive information concerning charging requirements of an electric vehicle, where the charging requirements include information indicative of a power requirement and an associated charging time; a memory containing: an energy distribution application; wherein the processor is configured by the energy distribution application to: transmit charging requirement information including a power requirement and an associated charging time via the network interface; receive charging information via the network interface; and controlling power delivered via the output to control charging of an electric vehicle in accordance with the received charging information.

In yet another embodiment, a sensor configured to detect the presence of a vehicle within a parking space, when the vehicle is not charging.

In another embodiment again, the energy distribution application configures the processor to communicate parking space occupancy information to a web gateway from which the parking space occupancy information can be retrieved via an application programming interface.

DETAILED DESCRIPTION

Figure 1:
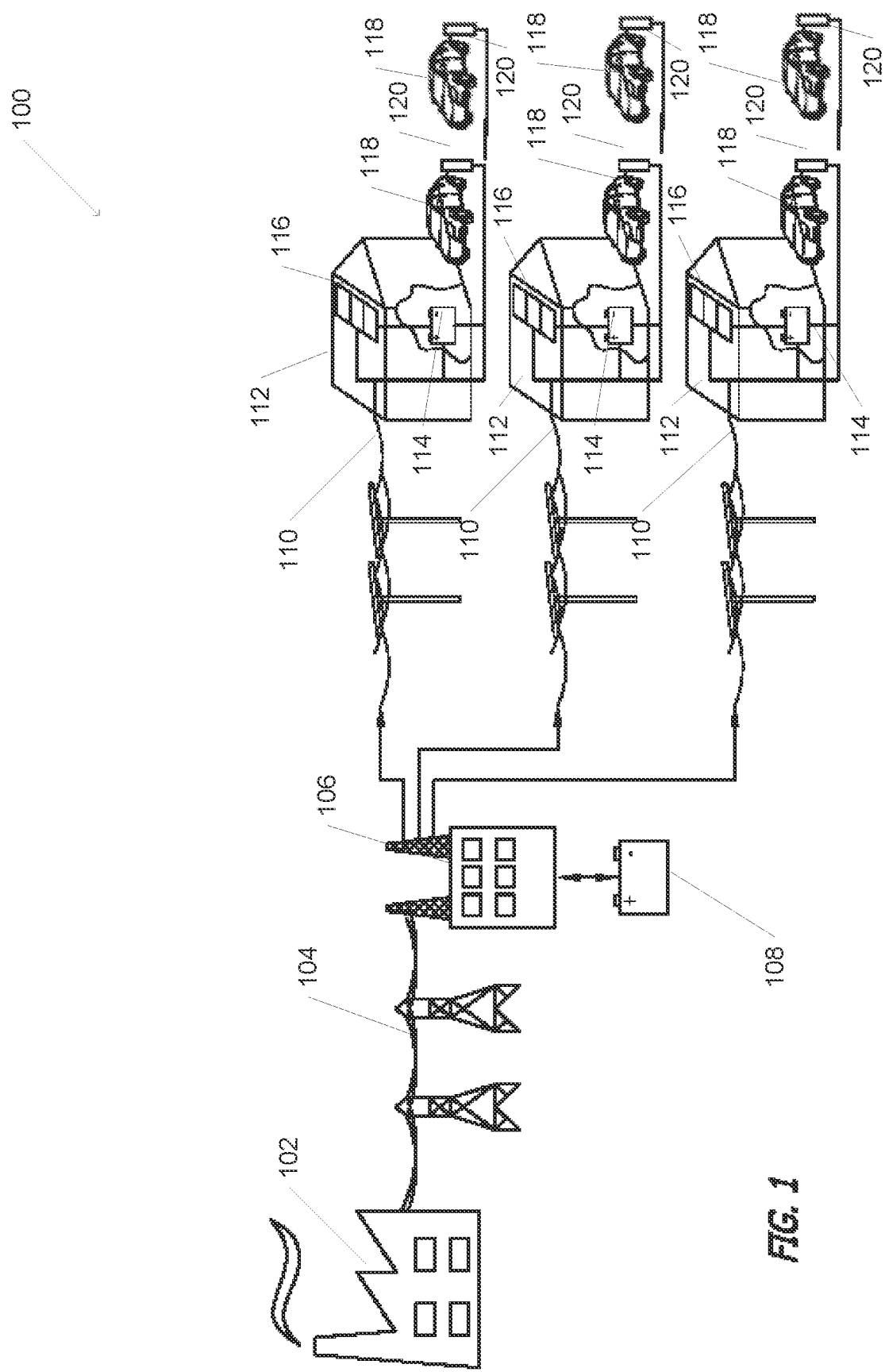
FIG. 1 is a diagram conceptually illustrating a power distribution network in accordance with an embodiment of the invention.

Turning now to the drawings, systems and methods for optimizing the electrical design for networks of electric vehicle supply equipment in accordance with embodiments of the invention are illustrated. An adaptive charging station (ACS) is a smart version of electrical vehicle supply equipment (EVSE) having dynamic adjustment features. EVSE generally can be any device which brings power to and/or fills an EVs battery, and are an intermediate between an EV and a power source. EVSE can utilize a variety of parameters including (but not limited to) voltages, amperages, current type, charging speeds, and/or plug types. Level 1 charging (L1) is generally the slowest form or charging and can connect an EV to a standard 110V or 120V outlet. Level 2 charging (L2) can provide additional voltage (generally up to 240V) and as such can provide a faster charge compared to L1. Level 3 charging (L3) generally uses up to 480V and can provide even faster charging than L1 or L2. In several embodiments of the invention, the SAE J1772 standard can be used to define AC charging levels. It should be readily apparent that other standardized systems for EVSEs can be utilized as appropriate including (but not limited to) CHAdeMO, SAE Combined Charging Solutions, and/or Tesla charging format and that EVSEs can include both alternating current (AC) and/or direct current (DC). Furthermore, the development of additional charging standards involving a variety of AC and/or DC charging profiles is contemplated.

ACS can be grouped together into an adaptive charging network (ACN). ACNs can be specifically designed for large scale fleet deployments such as (but not limited to) college campuses, corporate offices, airports, movie theaters, and/or malls. In comparison, deploying traditional EVSEs in such environments can be cost prohibitive and often times physically impossible. The transformers and/or available breaker spaces can frequently be limiting factors on how many traditional EVSEs can be installed in a single location such as in an existing parking garage.

Traditionally, groups of EVSEs are arranged in a hub and spoke arrangement so that the charging capacity can be guaranteed for each EVSE. The charging capacity in an ACS can, however, be dynamically controlled to fit various topologies. In many embodiments of the invention, ACNs can utilize a variety of topologies including (but not limited to) hub and spoke, bus, tree, daisy chaining, point-to-point, star, ring, mesh, and/or hybrid. When arranging groups of ACS within an existing parking structure, factors including (but not limited to) the geometry of the parking spaces and/or existing electrical wiring in the structure can significantly impact the available topologies that can be selected for the ACN.

In many embodiments, energy discovery protocol (EDP) processes can be utilized to distribute available capacity between upstream and/or downstream ACS within the ACN. In many embodiments, the ability to use EDP processes to allocate capacity to ACSs within an ACN enables the deployment of network topologies beyond the traditional hub and spoke topology used in most conventional EVSE arrays. While much of the discussion that follows describes the use of EDP processes in the context of EV charging, EDP processes are not limited to applications involving EVSE. Other devices with power requirements can be part of an EDP process implemented in accordance with various embodiments of the invention including (but not limited to) heating systems, cooling systems, lighting systems, and/or other applications.

In several embodiments, an ACN incorporating an L3 charger with an integrated transformer that provides a power bus for L2 chargers can be utilized to give further flexibility in implementing ACNs in existing infrastructures. In many embodiments of the invention, L2 chargers can connect to this integrated L3 charger via a shared bus (compared to for example, the more traditional L2 chargers connecting to a transformer in a star topology). As readily can be appreciated, combining components of the power distribution infrastructure with EVSE can greatly reduce installation cost of an ACN. In addition, use of power busses can further reduce cabling and installation costs.

Due to the importance of charging to EV operation and particularly information concerning the availability of EVSE at a given location, many EV operators rely upon web services that provide information concerning the availability of EVSE. When non-EVs park in EV designated parking spots, resources indicating whether a charging station is in use will fail to correctly indicate that the parking spot is occupied. In many embodiments of the invention, an ACS can utilize a sensor to indicate when the parking spot is blocked, even when the charging station is not in use. Sensors can be in various locations on the ACS including (but not limited to) above the parking spot, on the ground below the parking spot, and/or horizontally next to the parking spot (such as mounted on a wall).

Charging stations and processes utilized to perform energy discovery protocol processes in accordance with embodiments of the invention are discussed further below.

Electric Vehicle Power Distribution Networks

A power distribution network in accordance with an embodiment of the invention is shown in FIG. 1. Electricity is generated at power generator 102. Power transmission lines 104 can transmit electricity between the power generator and power substation 106. Power substation 106 additionally can connect to one or more large storage batteries 108, which temporarily store electricity, as well as power distribution lines 110. The power distribution lines 110 can transmit electricity from the power substation to an adaptive charging network (ACN) 112. ACNs 112 can include a battery 114, solar panels 116, and adaptive charging stations (ACSs) 120. Electric vehicles 118 can connect to the ACN (and therefore to the power distribution network) at the ACSs. Some charging networks can only charge a small number of electric vehicles, while others can have the necessary infrastructure to charge dozens or even hundreds of electric vehicles simultaneously.

The power generator 102 can represent a power source including (but not limited to) those using fossil fuels, nuclear, solar, wind, or hydroelectric power. Substation 106 changes the voltage of the electricity for more efficient power distribution. Solar panels 116 are distributed power generation sources, and can generate power to supply electric charging stations as well as generate additional power for the power grid.

Although many different systems are described above with reference to FIG. 1, any of a variety of power distribution networks including adaptive charging station controllers may be utilized to perform energy discovery protocol processes as appropriate to the requirements of specific applications in accordance with embodiments of the invention. Adaptive charging stations connected to an adaptive charging network in accordance with various embodiments of the invention are discussed below.

Adaptive Charging Station Controllers

Figure 2:
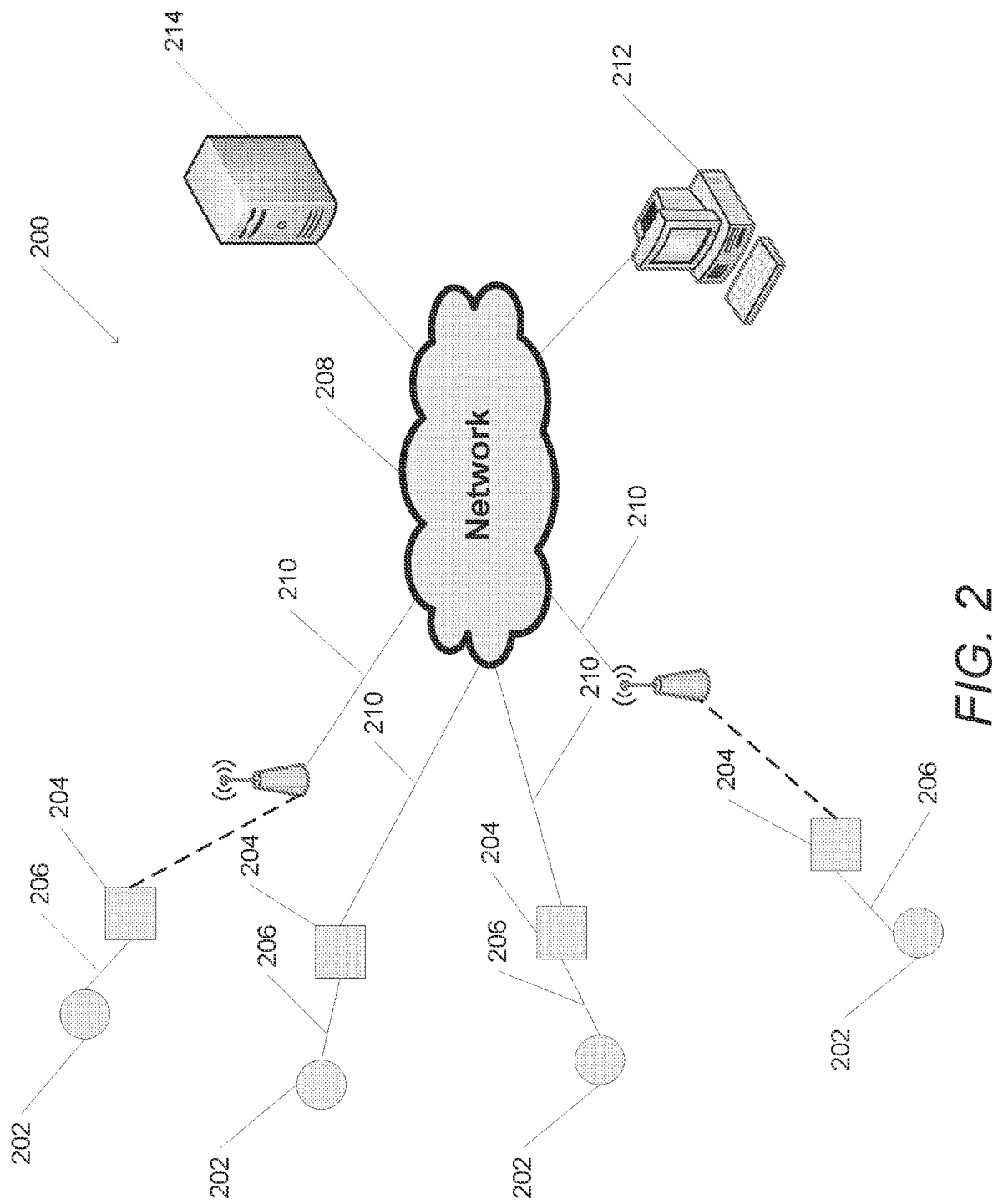
FIG. 2 is a diagram conceptually illustrating adaptive charging stations connected in an adaptive charging network in accordance with an embodiment of the invention.

ACSs connected to an ACN in accordance with an embodiment of the invention are shown in FIG. 2. EV nodes 202 can connect to ACSs 204 using a wired and/or wireless charging connection. ACSs can connect to the ACN 208 using wired and/or wireless connections 210. ACSs can communicate with each other over this wired and/or wireless connection. In some embodiments, ACSs can communicate via data flowing directly on the power line. The adaptive charging network may also be connected to one or more centralized computers 212 to monitor calculations made by or to send instructions to multiple EV nodes. Additionally, in many embodiments, a database management system 214 can be connected to the network to track EV node data which, for example, may be used to historically track power usage at various locations or at various times of day over time. In many embodiments, adaptive charging stations can use adaptive charging station controllers, where linked adaptive charging stations can distribute available charging capacity between upstream and downstream ACSs in the ACN. In several embodiments of the invention, ACSs can be connected in various topologies including (but not limited to) hub and spoke, bus, tree, daisy chaining, point-to-point, star, ring, mesh, and/or hybrid topologies.

Although many systems are described above with reference to FIG. 2, any of a variety of systems can be utilized to implement a network of adaptive charging stations connected in an adaptive charging network in a variety of topologies as appropriate to the requirements of specific applications in accordance with various embodiments of the invention. Adaptive charging station controllers in accordance with several embodiments of the invention are discussed below.

Figure 3:
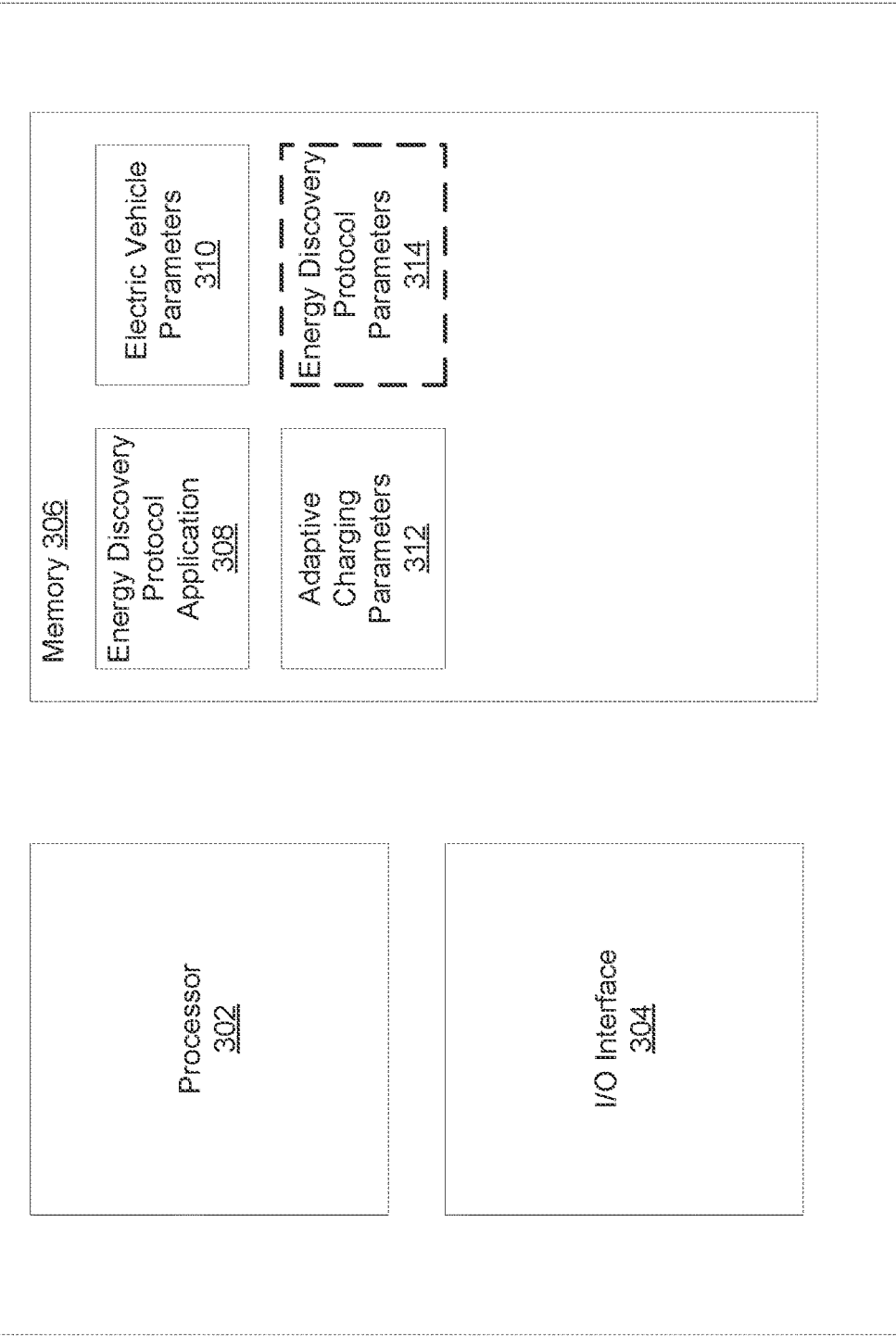
FIG. 3 is a block diagram of an adaptive charging station controller in accordance with an embodiment of the invention.

An adaptive charging station controller (ACS controller) in accordance with an embodiment of the invention is shown in FIG. 3. In various embodiments, the ACS controller 300 can perform calculations to distribute charging capacity between linked ACSs upstream and downstream within an ACN. In many embodiments, an ACS controller can make requests for available capacity from upstream nodes and/or transmit available capacity to downstream nodes.

In the illustrated embodiment, the ACS controller includes at least one processor 302, an I/O interface 304, and memory 306. In many embodiments, the memory includes software including EV charging application 308 as well as EV parameters 310, adaptive charging parameters 312, and energy discovery protocol parameters 314. An ACS can calculate charging optimal charging parameters by using a combination of its own electric vehicle parameters, adaptive charging parameters, and/or energy discovery protocol parameters received through the I/O interface. Adaptive charging parameters can include specific charging process parameters and/or optimization constraint parameters. Additionally, adaptive charging parameters can include parameters specific to adaptive charging stations and/or adaptive charging networks. Energy discovery protocol parameters can include (but is not limited to) parameters specific to available capacity, requested capacity from upstream ACSs, and/or transmitted capacity to downstream ACSs. Energy discovery protocol processes are discussed below. In a number of embodiments, the ACS controller and/or the ACS includes a touch screen display that enables the operator of an EV to provide information concerning the EV connected to an ACS and/or information concerning desired charging requirements (e.g. information indicative of a power requirement and an associated charging time such as (but not limited to) departure time and/or desired additional miles to add to range of EV). As is discussed further below, the ACS controller and/or ACS can also be connected to one or more sensors that can detect a vehicle occupying a specific parking space associated with the ACS when the vehicle is not drawing current from the ACS. In this way, the sensors enable the ACS controller to provide reliable information concerning the availability of the ACS to controllers within the CAN and/or operators of EVs more generally via web services.

Although a number of different ACS controller implementations are described above with reference to FIG. 3, any of a variety of computing systems can be utilized to control an ACS within an ACN as appropriate to the requirements of specific applications in accordance with various embodiments of the invention. Various configurations of ACSs within an ACN in accordance with many embodiments of the invention are discussed below.

Adaptive Charging Network Topologies

Adaptive charging stations can be configured in a variety of ways within an ACN. In many embodiments, the topology of an ACN installed in a preexisting structure can be determined from (but not limited to) the shape, path, wires, and/or parking spots preexisting in the location. ACSs are generally flexible to adapt and form an ACN in any preexisting building structure.

Figure 4A:
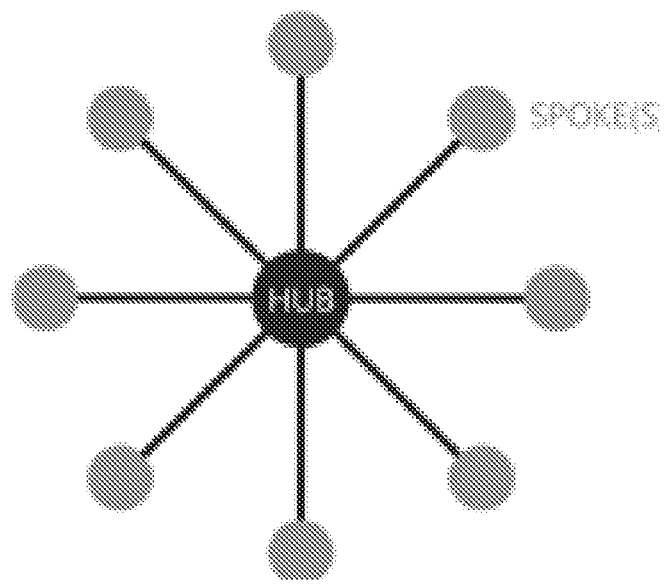
FIG. 4A is a diagram conceptually illustrating a hub and spoke adaptive charging station topology in accordance with an embodiment of the invention.
Figure 4B:
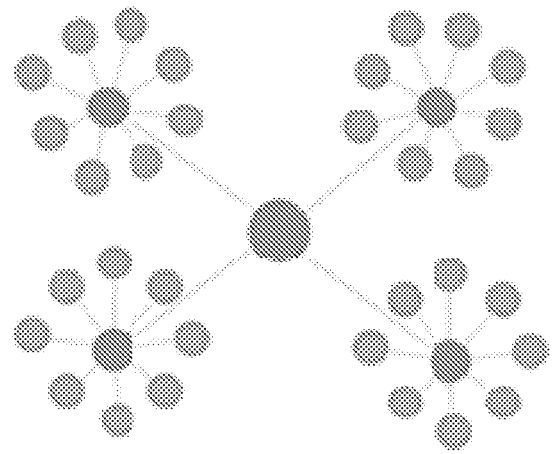
FIG. 4B is a diagram conceptually illustrating a distributed hub and spoke adaptive charging station topology in accordance with an embodiment of the invention.
Figure 4C:
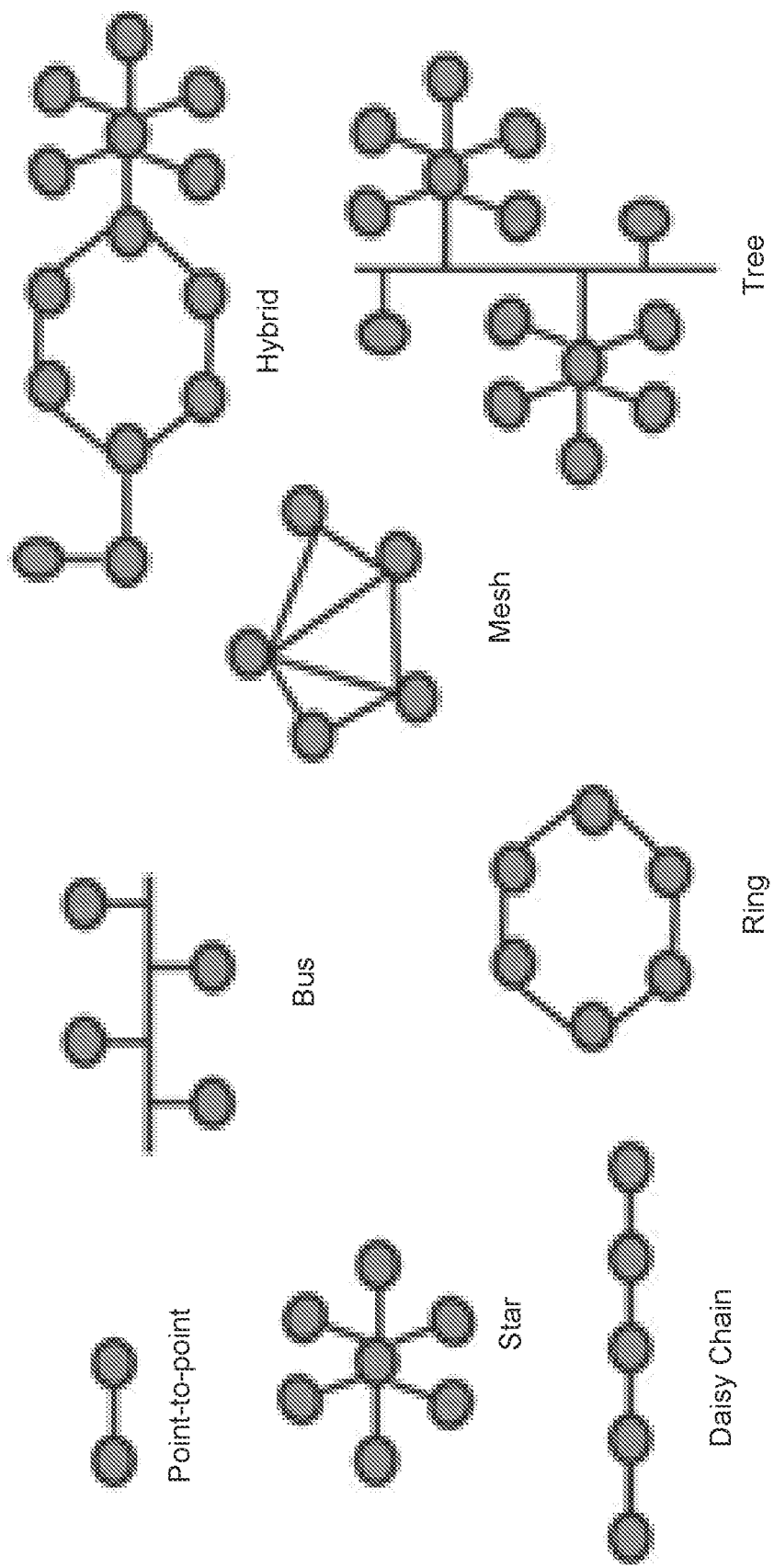
FIG. 4C is a diagram conceptually illustrating a variety of adaptive charging station topologies in accordance with an embodiment of the invention.

Traditional EVSEs are generally placed in a hub and spoke configuration so that capacity for each EVSE can be guaranteed. FIG. 4A illustrates this traditional hub and spoke configuration. An electric panel is generally found at the hub and EVSEs can be found at the spokes. The term electric panel is utilized to describe a component within a power supply system in which a supply of power is distributed across a number of circuits. An electric panel often involves safety circuitry such as (but not limited to) circuit breakers that are designed to protect the electronic devices connected to the power supply from aberrations in the power supply and/or to detect potential malfunctions of devices connected to the power supply circuits. When ACSs are utilized in accordance with various embodiments of the invention, capacity can be dynamically controlled by the ACSs to fit the desired topology. FIG. 4B illustrates a distributed hub-spoke topology, and FIG. 4C illustrates a variety of topologies including point-to-point, bus, star, daisy chain, ring, mesh, hybrid, and tree. In many embodiments, ACSs within these types of topologies can utilize an EDP process to distribute available capacity to other linked ACS within the ACN. EDP processes involve determining the actual capacity of individual ACSs and communicating this information throughout the ACN to allocate capacity between ACSs in a manner that enables them to meet their load requirements (where possible). As is discussed further below, EDP processes can involve performing network discovery to determine the topology of an CAN and/or communicating available capacity via power line communication and/or use of separate networking infrastructure including (but not limited to) providing mesh networking capabilities within ACSs.

Extending High Voltage Distribution within an ACN

Figure 5:
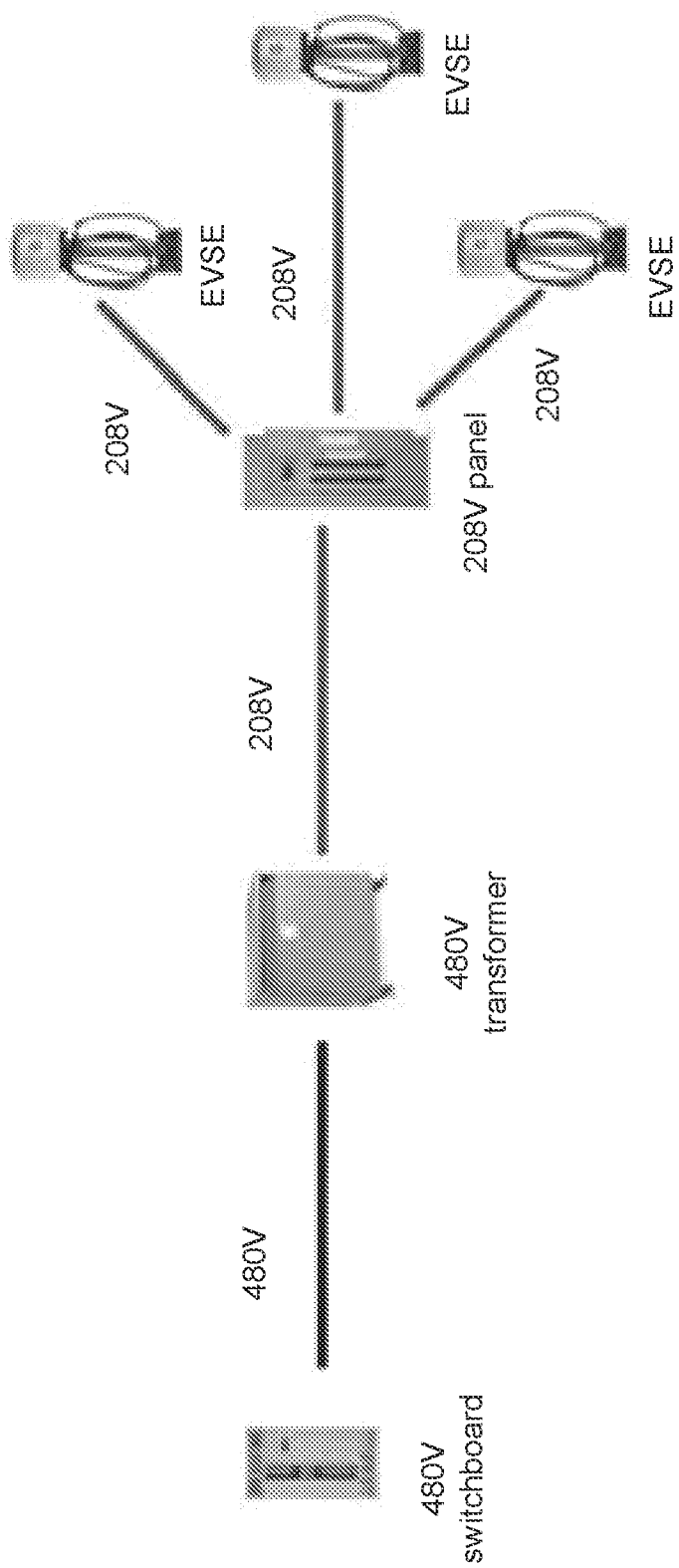
FIG. 5 is a diagram illustrating a hub and spoke electrical vehicle supply equipment (EVSE) network configuration connected to a 480V transformer.

Many traditional EV charging networks utilize a 480V step down transformer which can feed a branch panel. This branch panel can then feed a 208V supply line to one or more EVSEs. In some configurations, the branch panel can be the hub and the EVSEs can be the spokes in the hub and spoke topology discussed above. FIG. 5 illustrates this more traditional EVSE charging network where 480V power is distributed from an electric panel to a step down transformer. As described above, the transformer then passes 208V to a branch panel, which supplies 208V to several EVSEs.

A large portion of resources including (but not limited to) time and/or money associated with the installation of an EV charging network can be spent on planning and installing an EV charging network similar to the EV charging network described in FIG. 5 (in addition to the costs of the individual components of the EV charging network). In many embodiments, elements can be miniaturized and distributed towards the edges of the ACN. Additionally, in several embodiments, extending the high voltage (e.g. 480V supply) into the network as far as possible can reduce installation costs (e.g. reducing wire thicknesses relative to lower voltage wiring by up to 50%—a potentially large amount of copper and/or other materials).

Figure 6:
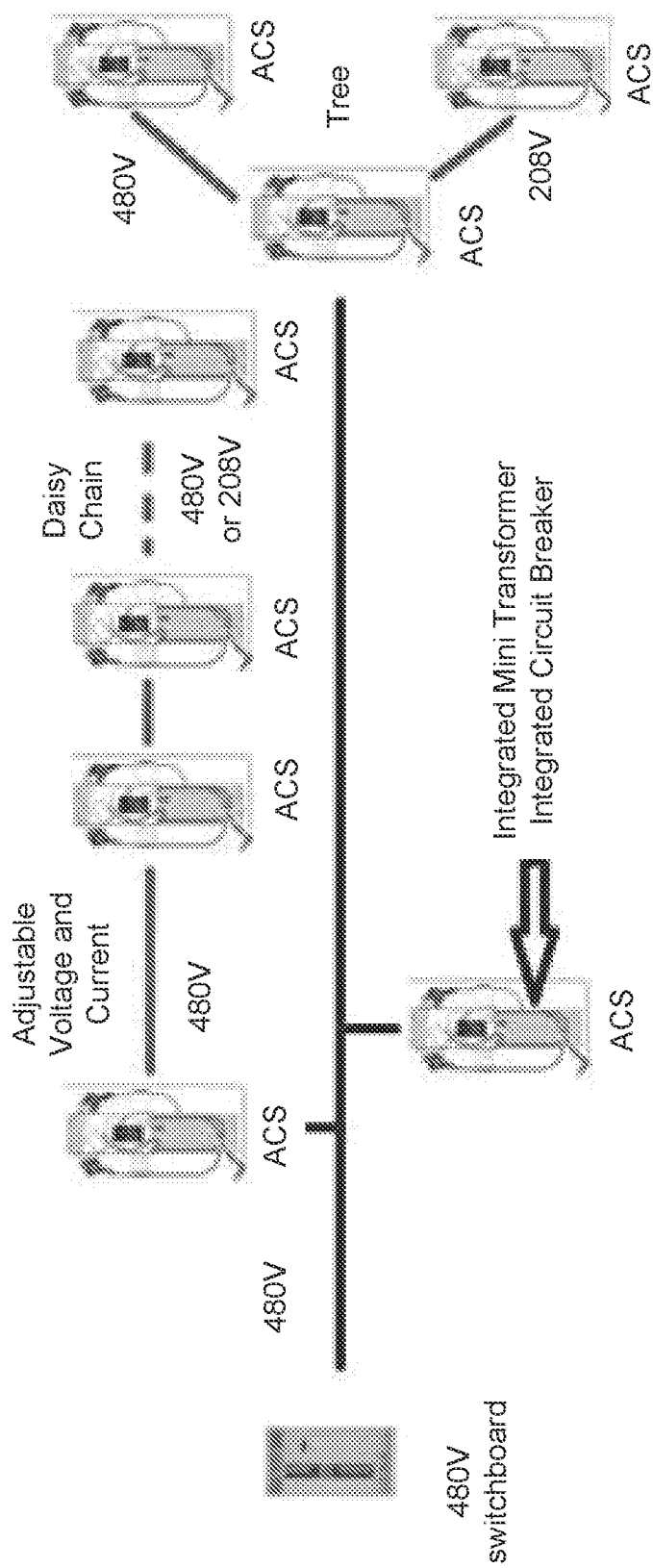
FIG. 6 is a diagram illustrating a network including an adaptive charging station with an integrated mini transformer in accordance with an embodiment of the invention.

FIG. 6 illustrates an illustrative ACN with a miniaturized 480V distribution panel supplying 480V to three ACS including an ACS with an integrated mini transformer. The ACN has both daisy chain and tree portions giving the ACN illustrated in FIG. 6 a hybrid topology. It should readily apparent that the ACN in FIG. 6 is merely illustrative and any number of combinations of fully sized and/or miniaturized pieces of equipment can be used with any network topology as appropriate to specific requirements. Processes to transmit available capacity within an ACN to linked ACSs are discussed below.

Energy Discovery Protocol Processes

Figure 7:
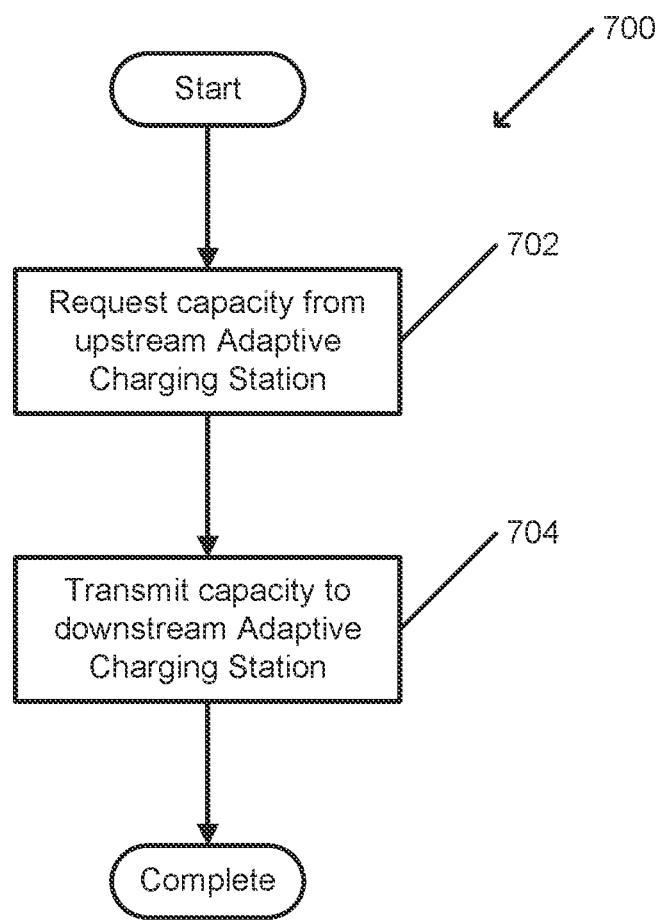
FIG. 7 is a flow chart illustrating a process to distribute excess capacity between neighboring adaptive charging stations in accordance with an embodiment of the invention.

An Energy Discovery Protocol (EDP) process that can be used to distribute available capacity within an ACN is illustrated in FIG. 7. ACSs within the ACN generally need to be linked to share capacity. An ACS can be linked by upstream and downstream ACSs. Upstream ACSs are located between the current ACS and the power supply within the ACN. The current ACS is located between downstream ACSs and the power supply within the ACN. In some embodiments, the addition of renewable energy sources such as (but not limited to) solar panels and/or batteries, can change which ACSs are upstream and/or downstream over time as different power sources become available within the ACN.

Traditional EVSE configurations generally assume the availability of full power one hundred percent of the time. For example, a device using a NEMA 14-50 receptacle assumes 50 A of capacity is available at all times. ACSs can utilize EDP processes to communicate with neighboring ACSs and receive information concerning the actual energy capacity of neighboring ACSs. In many embodiments, ACSs can request (702) available capacity from upstream ACSs. If this capacity required for a given load at a specific ACS is available based upon information received from other ACSs concerning available capacity, the specific ACS can provide the required power to the given load.

ACSs can receive requests for capacity from downstream ACSs. In many embodiments, when capacity is available, an ACS can provide available capacity to downstream ACSs. It should readily be apparent that some ACN topologies may have sections with different capacity demands (for example but not limited to a hybrid topology involving both L3 and L2 chargers) and an ACS can transmit a received request for capacity from a downstream ACS further upstream to an additional ACS when the transmitting ACS lacks the available capacity itself to meet the capacity demands of the downstream ACS. In many embodiments, a central service can store the capacities of all ACSs to assist with allocation of capacity using either a centralized distribution process and/or a distributed process for determining the capacity requirements of individual ACSs (see for example the processes described in U.S. patent application Ser. No. 15/295,877 entitled "Adaptive Charging Algorithms for a Network of Electric Vehicles" to Z. Low et al., filed Oct. 17, 2016, now issued as U.S. Pat. No. 10,320,203, the relevant disclosure from which including the disclosure related to capacity allocation is hereby incorporated by reference in its entirety).

Although many different EDP processes are described above with reference to FIG. 7, any of a variety of processes may be utilized to distribute available capacity within an ACN to upstream and downstream ACSs as appropriate to the requirements of specific applications in accordance with many embodiments of the invention.

ACNs Incorporating an ACS with an Integrated Transformer

Figure 8:
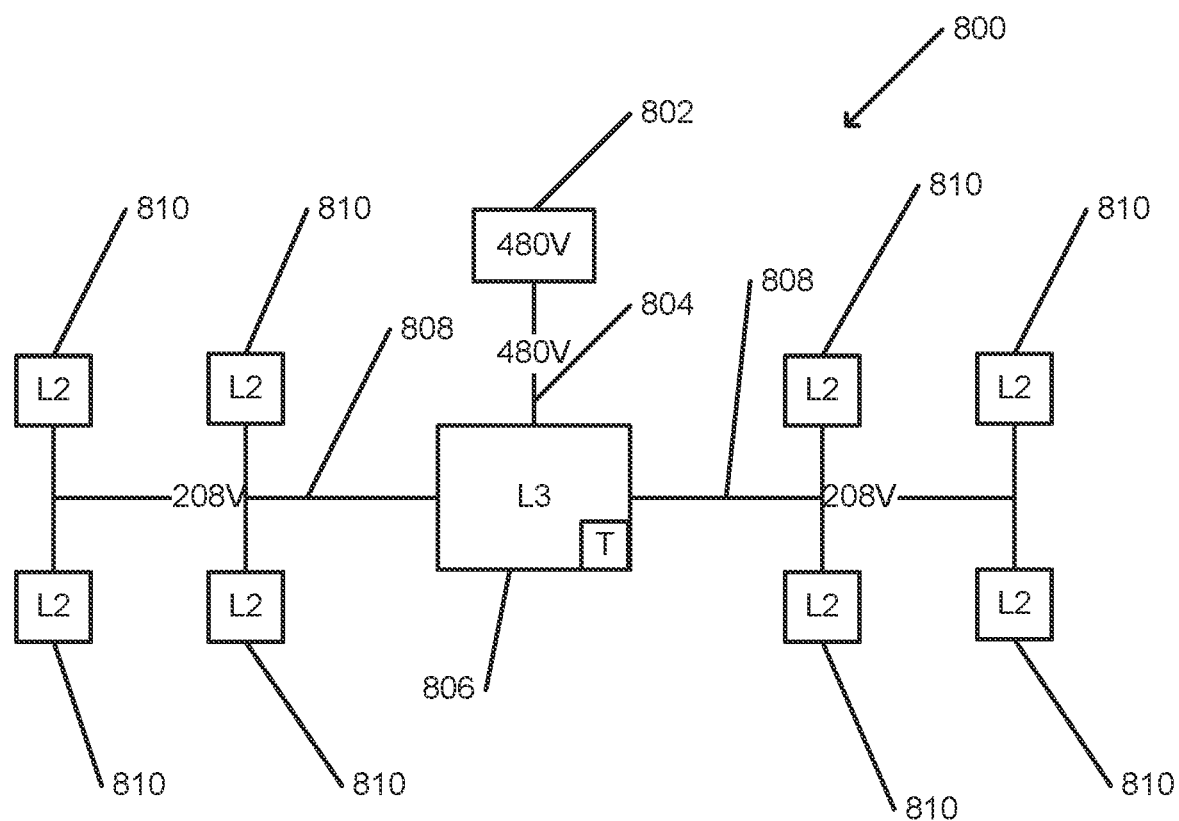
FIG. 8 is a diagram conceptually illustrating an adaptive charging station with an integrated transformer in an adaptive charging network in accordance with an embodiment of the invention.

In many embodiments of the invention, ACSs can have integrated transformers. FIG. 8 illustrates an ACN incorporating an ACS with an integrated transformer. High voltage power (e.g. 480V power) is supplied to the network 802 from a source via a high voltage line 804, which can include (but is not limited to) an electric panel. As noted above, a high voltage line can often have a narrower cross section than lower voltage lines that carry higher currents. ACS 806 includes an integrated transformer which steps down the supplied high voltage to a lower step down voltage (e.g. 208V) that is passed to the rest of the ACN along wires 810. It should be readily apparent that 480V and/or 208V are merely illustrative and other input and step down voltages can be utilized as appropriate to the requirements of specific embodiments. ACSs 810, each receiving 208V, connect to ACS 806 by a shared bus 810. In addition, ACSs 810 can be connected in any of the topologies discussed above including (but not limited to) point-to-point, bus, star, daisy chain, ring, mesh, hybrid, and/or tree. As can readily be appreciated, the ability to run a single line from an electrical panel to an ACS incorporating an integrated transformer and then to connect additional ACSs to the ACS incorporating the transformer can greatly reduce installation labor and material costs. These savings can decrease the time for a facility to recover the cost of installing the ACN and/or enable the installation of additional ACSs. Further savings can be achieved by incorporating junction boxes within individual ACSs 810 so that wiring can simply be run between ACSs. In a number of embodiments, tamper resistant plugs and sockets (e.g. plugs and connectors that are contained within the housing and from which the connector is difficult to remove when the housing of the ACS is secured) can be utilized to further simplify the installation of a series of ACSs.

Although a variety of ACNs incorporating ACSs with integrated transformers are described above with reference to FIG. 8, any of a variety of power distribution networks which can integrate a transformer with an EVSE may be utilized as appropriate to the requirements of specific applications in accordance with embodiments of the invention.

Charging Processes

In many embodiments of the invention, ACS can use adaptive charging processes to adapt the charging rates of all EVs dynamically based on the current state of the system without precise knowledge of future conditions. Adaptive charging processes can include (but are not limited to) online linear programming processes, least laxity first processes, and/or linear programs with congestion management processes. Examples of appropriate processes include (but are not limited) to the processes described in U.S. patent application Ser. No. 15/295,887 entitled "Adaptive Charging Algorithms for a Network of Electric Vehicles" to Z. Low et al., filed Oct. 17, 2016, now issued as U.S. Pat. No. 10,320,203 incorporated by reference above. In many embodiments, the ACS receives charging information that enables the ACS to control the charging of an EV in a manner that is coordinated with the other ACSs within the ACN to achieve an overall objective with respect to the allocation of capacity amongst ACSs. In several embodiments, the charging information can include information indicative of a power level and/or current level that is utilized to control power delivered to a charging EV. In many embodiments, the charging information may direct the ACS to deliver no power to an EV and instead to supply power to other downstream ACSs. As can readily be appreciated, the specific charging information is largely dependent upon the requirements of a given application and the specific power requirements of any EVs that may be utilizing the ACN at a given time.

In several embodiments, charging processes can be customized to optimize different performance criteria such as (but not limited to) minimizing electricity costs, minimizing weighted average or maximum charging time, maximizing robustness, maximizing asset utilization, maximizing welfare, and/or a combination of criteria. In many other embodiments, the topology and/or the type of chargers utilized can effect charging processes. For example, when daisy chaining L3 ACS you can have a variety of capacities. These parameters are linear and can be captured in a linear programming process for charging.

Constraints may be automatically detected by the ACN. In other embodiments, a description of the ACN (such as but not limited to a configuration file describing the system) can be utilized to specify which ACS will share resources.

Parked Vehicle Detection Processes

Figure 9A:
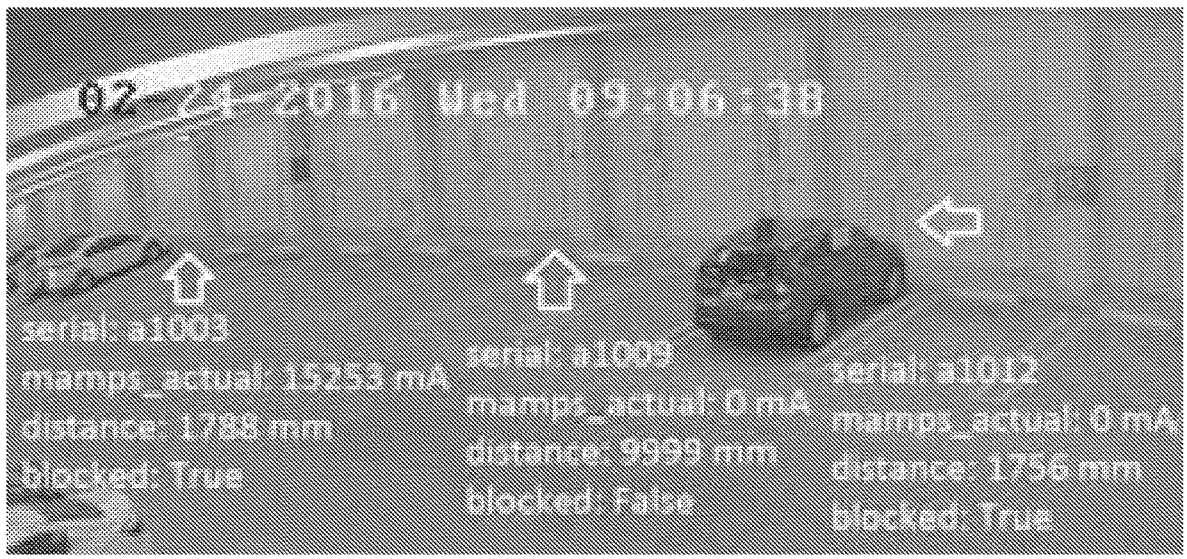
FIG. 9A is an image illustrating sensor data for three parking spots in a parking garage using parking detection sensors in accordance with an embodiment of the invention.
Figure 9B:
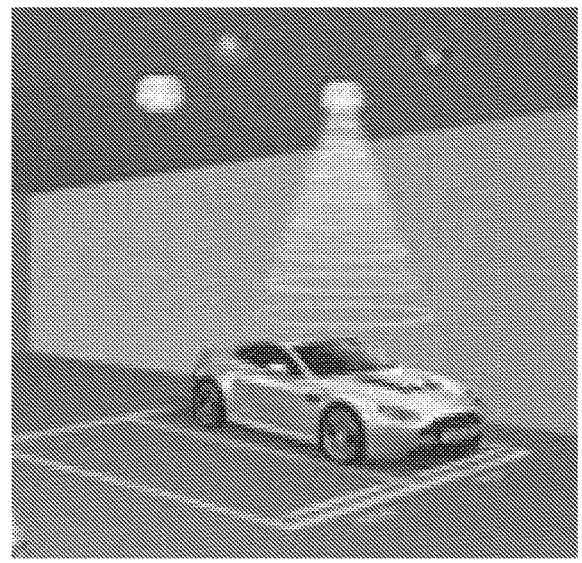
FIG. 9B is an image illustrating sensor placement for parking detection sensors in accordance with an embodiment of the invention.

Traditional EVSE can often be blocked by vehicles which are not charging which can prevent EVs from reaching the charging station. In many instances, traditional charging networks will incorrectly report EVSE availability (for example online) when in fact the EVSE is obstructed by the blocked parking spot. In many embodiments, ACSs can include a sensor to detect obstructions to parking spaces. FIG. 9A illustrates an image of a parking garage with sensor data for three parking spots, two blocked by vehicles and one unblocked. A variety of sensors can be utilized including (but not limited to) ultrasonic, proximity, cameras, and/or pressure. FIG. 9B illustrates parked vehicle detection using an overhead sensor. Sensors integrated with ACS can be places in a variety of positions including (but not limited) above a vehicle, below a vehicle, and/or horizontal to a vehicle (such as mounted on a wall of a parking garage). Combining sensor data with other station activity information can detect many states including (but not limited to) parked and idle connected, parked and active charging, parked and finished charging, and/or parked and not connected (i.e. blocking). Data concerning station activity can be aggregated in servers that publish the data via web services, which enable software such as (but not limited to) software applications on mobile devices and/or web browser applications to display reliable information concerning the availability of EV chargers at a given location.

Although many different parking detection processes are described above with reference to FIGS. 9A and 9B, any of a variety of processes may be utilized to detect parking and charging states of vehicles at ACS as appropriate to the requirements of specific applications in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An adaptive charging network, comprising:
   an electrical power supply;
   a plurality of adaptive charging stations including a plurality of first level adaptive charging stations (ACSs) providing power to electric vehicles (EVs) at a first voltage level;
   at least one second level adaptive charging station that provides power to an electric vehicle at a second voltage level that is higher than the first voltage level and that distributes power via a shared power bus to a plurality of first level adaptive charging stations, wherein the at least one second level adaptive charging station includes an integrated mini transformer and an integrated circuit breaker and wherein the plurality of first level ACSs connect to the at least one second level ACS via the shared power bus;
   wherein the plurality of ACSs are linked by upstream and downstream ACSs, where, with respect to a current ACS, an upstream ACS is located between the current ACS and the electrical power supply and wherein a downstream ACS is located after the current ACS such that the current ACS is located between the downstream ACS and the electrical power supply;
   wherein at least one adaptive charging station is configured to communicate capacity information to a controller that uses adaptive charging processes to adapt the charging rates of EVs dynamically based on a current state of the adaptive charging network; and
   wherein the controller is configured to dynamically control the distribution of power to the plurality of first level adaptive charging stations based upon the capacity information received from the at least one adaptive charging station;
   wherein the at least one adaptive charging station is configured to receive requests for capacity from at least one downstream adaptive charging station and, transmit the received requests for capacity further upstream to an additional ACS based on a determination that the at least one adaptive charging stations lacks available capacity;
   wherein the at least one second level adaptive charging station that distributes power via the shared power bus to the plurality of first level adaptive charging stations:
      receives a high voltage supply from the electrical power supply and uses the integrated mini transformer to step down the high voltage supply, wherein the high voltage supply is an alternating current (AC); and
      distributes, via the shared power bus, the stepped down high voltage supply to at least one first level adaptive charging station.

2. The adaptive charging network of claim 1, wherein the at least one adaptive charging station is configured to communicate capacity information in accordance with an energy discovery protocol process performed by the plurality of adaptive charging stations.

3. The adaptive charging network of claim 1, wherein at least one of the plurality of adaptive charging stations is configured to communicate capacity information via power line communications.

4. The adaptive charging network of the claim 1, wherein at least one of the plurality of adaptive charging stations is configured to communicate capacity information via wireless communication.

5. The adaptive charging network of claim 1, wherein at least one of the plurality of adaptive charging stations comprises a sensor configured to detect the presence of a vehicle within a parking space, when the vehicle is not charging.

6. The adaptive charging network of claim 5, wherein the at least one of the plurality of adaptive charging stations that comprises a sensor configured to detect the presence of a vehicle within a parking space is further configured to communicate parking space occupancy information to a web gateway from which the parking space occupancy information can be retrieved via an application programming interface.

7. The adaptive charging network of claim 1, wherein at least one of the plurality of adaptive charging stations comprises a touch screen user interface configured to receive information concerning charging requirements of an electric vehicle.

8. The adaptive charging network of claim 1, wherein the controller is configured to control the distribution of power to the plurality of adaptive charging stations based upon the capacity information received from the at least one adaptive charging station using linear programming.

9. The adaptive charging network of claim 8, wherein:
   at least one of the plurality of adaptive charging stations comprises a touch screen user interface configured to receive information concerning charging requirements of an electric vehicle including information indicative of a power requirement and an associated charging time; and
   the controller solves the linear program based upon the capacities of the plurality of adaptive charging stations, and at least one power requirement and an associated charging time.

10. The adaptive charging network of claim 1, further comprising a plurality of power sources.

11. The adaptive charging network of claim 10, wherein the plurality of power sources comprises at least one selected from the group consisting of: an electric panel; a photovoltaic array; and a battery.

12. An adaptive charging station, comprising:
an input configured to receive a high voltage power supply, wherein the high voltage power supply is an alternating current;
an integrated mini transformer configured to step down the high voltage power supply to a create a stepped down power supply;
an integrated circuit breaker;
at least one output configured to provide power to an electric vehicle and to distribute the stepped down power supply to a plurality of adaptive charging stations (ACSs) including to a plurality of first level adaptive charging stations via a shared power bus, wherein the plurality of ACSs are linked by upstream and downstream ACSs, where, with respect to a current ACS, an upstream ACS is located between the current ACS and the high voltage power supply and wherein a downstream ACS is located after the current ACS such that the current ACS is located between the downstream ACS and the high voltage power supply;
a network interface;
a processor;
a memory containing:
an energy distribution application that uses adaptive charging processes to adapt charging rates of EVs dynamically based on a current state of a network of adaptive charging stations;
wherein the processor is configured by the energy distribution application to:
generate a stepped down voltage from a high voltage power supply received via the input using the integrated mini transformer; and
distribute, via the shared power bus, the stepped down voltage to a plurality of first level adaptive charging stations in the network, wherein the first level adaptive charging stations provide power to electric vehicles at a first voltage level;
receive requests for capacity from at least one downstream adaptive charging station transmit the received requests for capacity further upstream to an additional ACS based on a determination that there is a lack of available capacity; and
provide power to an electric vehicle at a second voltage level that is higher than the first voltage level.

13. The adaptive charging station of claim 12, wherein the energy distribution application further configures the processor to transmit capacity information via the network interface.

14. The adaptive charging station of claim 12, wherein the energy distribution application further configures the processor to receive capacity information via the network interface.

15. The adaptive charging station of claim 12, wherein the energy distribution application further configures the processor to generate a stepped down voltage based upon capacity information received via the network interface.

16. The adaptive charging station of claim 12, further comprising a sensor configured to detect the presence of a vehicle within a parking space, when the vehicle is not charging.

17. The adaptive charging station of claim 16, wherein the energy distribution application configures the processor to communicate parking space occupancy information to a web gateway from which the parking space occupancy information can be retrieved via an application programming interface.

18. The adaptive charging station of claim 12, further comprising a touch screen user interface configured to receive information concerning charging requirements of an electric vehicle.

19. The adaptive charging station of claim 18, wherein the charging requirements include information indicative of a power requirement and an associated charging time.

20. An adaptive charging station, comprising:
an input configured to receive a power supply, wherein the power supply is an alternating current;
an integrated mini transformer for stepping down the power supply and that provides a shared power bus for connecting to a plurality of adaptive charging stations (ACSs) in a network including to a plurality of first level adaptive charging stations that provide power to electric vehicles at a first voltage level, wherein the plurality of ACSs are linked by upstream and downstream ACSs, where, with respect to a current ACS, an upstream ACS is located between the current ACS and the power supply and wherein a downstream ACS is located after the current ACS such that the current ACS is located between the downstream ACS and the power supply;
an integrated circuit breaker;
an output for providing power to an electric vehicle at a second voltage level that is higher than the first voltage level;
a network interface;
a processor;
a touch screen user interface configured to receive information concerning charging requirements of an electric vehicle, where the charging requirements include information indicative of a power requirement and an associated charging time;
a memory containing:
an energy distribution application that uses adaptive charging processes to adapt charging rates of EVs dynamically based on a current state of the network;
wherein the processor is configured by the energy distribution application to:
transmit charging requirement information including a power requirement and an associated charging time via the network interface;
receive charging information via the network interface;
controlling power delivered via the output to control charging of an electric vehicle in accordance with the received charging information; and
receive requests for capacity from at least one downstream adaptive charging station and transmit the received requests for capacity further upstream to an additional ACS based on a determination that there is a lack of available capacity.

21. The adaptive charging station of claim 20, further comprising a sensor configured to detect the presence of a vehicle within a parking space, when the vehicle is not charging.

22. The adaptive charging station of claim 21, wherein the energy distribution application configures the processor to communicate parking space occupancy information to a web gateway from which the parking space occupancy information can be retrieved via an application programming interface.

* * * * *